US011951679B2

(12) United States Patent
Thompson et al.

(10) Patent No.: US 11,951,679 B2
(45) Date of Patent: Apr. 9, 2024

(54) ADDITIVE MANUFACTURING SYSTEM

(71) Applicant: General Electric Company, Schenectady, NY (US)

(72) Inventors: Mary Kathryn Thompson, Fairfield Township, OH (US); Xi Yang, Mason, OH (US); Meredith Elissa Dubelman, Liberty Township, OH (US); William Joseph Steele, Lawrenceburg, IN (US); Trent William Muhlenkamp, Cincinnati, OH (US); John Thomas Sterle, Clifton Park, NY (US); Christopher David Barnhill, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/837,223

(22) Filed: Jun. 10, 2022

(65) Prior Publication Data
US 2022/0402198 A1  Dec. 22, 2022

Related U.S. Application Data

(60) Provisional application No. 63/211,069, filed on Jun. 16, 2021.

(51) Int. Cl.
*B29C 64/232* (2017.01)
*B29C 64/124* (2017.01)
(Continued)

(52) U.S. Cl.
CPC .......... *B29C 64/124* (2017.08); *B29C 64/232* (2017.08); *B29C 64/236* (2017.08); *B33Y 10/00* (2014.12); *B33Y 30/00* (2014.12)

(58) Field of Classification Search
CPC ... B29C 64/124; B29C 64/129; B29C 64/232; B29C 64/236; B29C 64/245; B29C 64/223; B33Y 10/00; B33Y 30/00
See application file for complete search history.

(56) References Cited

U.S. PATENT DOCUMENTS

| 1,990,749 A | 2/1935 | Phillips et al. |
| 2,259,517 A | 10/1941 | Drenkard, Jr. |
| (Continued) |

FOREIGN PATENT DOCUMENTS

| CN | 101628477 A | 1/2010 |
| CN | 103210344 A | 7/2013 |
| (Continued) |

OTHER PUBLICATIONS

Admatec, Admaflex 300 DLP 3D Printer, Specifications, Features, Design and Functions, Netherlands, 2 Pages. Retrieved Nov. 5, 2020 from Webpage: https://admateceurope.com/files/10f1a369c223994 3e6506f27ba920bd4dd9359078e744369695ab6ffbde75c6c?filename= Admaflex%20300%20brochure.pdf&sig=hQyDlzxkSmFOZwjM.

(Continued)

*Primary Examiner* — Thu Khanh T. Nguyen
*Assistant Examiner* — Jamel M Nelson
(74) *Attorney, Agent, or Firm* — Dority & Manning, P.A.

(57) ABSTRACT

An additive manufacturing apparatus can include a stage configured to hold a component formed by one or more layers of resin. A support plate can be positioned above the stage. A radiant energy device can be positioned above the stage. The radiant energy device can be operable to generate and project energy in a predetermined pattern. A feed module can be configured to operably couple with a first end portion of a resin support and can be positioned upstream of the stage. A take-up module can be configured to operably (Continued)

couple with a second end portion of the resin support and can be positioned downstream of the stage.

13 Claims, 15 Drawing Sheets

(51) Int. Cl.
    *B29C 64/236*     (2017.01)
    *B33Y 10/00*     (2015.01)
    *B33Y 30/00*     (2015.01)

(56) References Cited

U.S. PATENT DOCUMENTS

| | | |
|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,192,559 A * | 3/1993 | Hull .................. B29C 64/188 425/375 |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,607,540 A * | 3/1997 | Onishi ............... B29C 64/147 156/235 |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |
| 7,164,420 B2 | 1/2007 | Ard |
| 7,195,472 B2 | 3/2007 | John |
| 7,261,542 B2 | 8/2007 | Hickerson et al. |
| 7,270,528 B2 | 9/2007 | Sherwood |
| 7,300,613 B2 | 11/2007 | Sano et al. |
| 7,351,304 B2 | 4/2008 | Liang et al. |
| 7,402,219 B2 | 7/2008 | Graf |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,555,726 B2 | 6/2009 | Kurtenbach et al. |
| 7,569,174 B2 | 8/2009 | Ruatta et al. |
| 7,572,403 B2 | 8/2009 | Gu et al. |
| 7,575,682 B2 | 8/2009 | Olsta et al. |
| 7,578,958 B2 | 8/2009 | Patel et al. |

(56) References Cited

U.S. PATENT DOCUMENTS

| | | |
|---|---|---|
| 7,614,866 B2 | 11/2009 | Sperry et al. |
| 7,614,886 B2 | 11/2009 | Sperry et al. |
| 7,636,610 B2 | 12/2009 | Schillen et al. |
| 7,698,947 B2 | 4/2010 | Sarr |
| 7,706,910 B2 | 4/2010 | Hull et al. |
| 7,742,060 B2 | 6/2010 | Maillot |
| 7,758,799 B2 | 7/2010 | Hull et al. |
| 7,767,132 B2 | 8/2010 | Patel et al. |
| 7,771,183 B2 | 8/2010 | Hull et al. |
| 7,780,429 B2 | 8/2010 | Kikuchi |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,931,460 B2 | 4/2011 | Scott et al. |
| 7,962,238 B2 | 6/2011 | Shkolnik et al. |
| 7,964,047 B2 | 6/2011 | Ishida |
| 7,995,073 B1 | 8/2011 | Shemanarev et al. |
| 8,003,040 B2 | 8/2011 | El-Siblani |
| 8,071,055 B2 | 9/2011 | Davidson et al. |
| 8,029,642 B2 | 10/2011 | Hagman |
| 8,048,261 B2 | 11/2011 | McCowin |
| 8,070,473 B2 | 12/2011 | Kozlak |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,096,262 B2 | 6/2012 | Ederer et al. |
| 8,191,500 B2 | 6/2012 | Dohring et al. |
| 8,211,226 B2 | 7/2012 | Bredt et al. |
| 8,232,444 B2 | 7/2012 | Bar Nathan et al. |
| 8,259,103 B2 | 9/2012 | Glueck et al. |
| 8,269,767 B2 | 9/2012 | Glueck et al. |
| 8,282,866 B2 | 10/2012 | Hiraide |
| 8,326,024 B2 | 12/2012 | Shkolnik |
| 8,372,330 B2 | 2/2013 | El-Siblani et al. |
| 8,394,313 B2 | 3/2013 | El-Siblani et al. |
| 8,413,578 B2 | 4/2013 | Doyle |
| 8,424,580 B2 | 4/2013 | Anderson et al. |
| 8,444,903 B2 | 5/2013 | Lyons et al. |
| 8,454,879 B2 | 6/2013 | Kuzusako et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,513,562 B2 | 8/2013 | Bichsel |
| 8,522,159 B2 | 8/2013 | Kurtenbach et al. |
| 8,540,501 B2 | 9/2013 | Yasukochi |
| 8,568,646 B2 | 10/2013 | Wang et al. |
| 8,568,649 B1 | 10/2013 | Balistreri et al. |
| 8,593,083 B2 | 11/2013 | Firhoj et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,663,568 B2 | 3/2014 | Bar Nathan et al. |
| 8,666,142 B2 | 3/2014 | Shkolnik et al. |
| 8,703,037 B2 | 4/2014 | Hull et al. |
| 8,715,832 B2 | 5/2014 | Ederer et al. |
| 8,718,522 B2 | 5/2014 | Chillscyzn et al. |
| 8,737,862 B2 | 5/2014 | Manico et al. |
| 8,741,194 B1 | 6/2014 | Ederer et al. |
| 8,741,203 B2 | 6/2014 | Liska et al. |
| 8,744,184 B2 | 6/2014 | Ameline et al. |
| 8,761,918 B2 | 6/2014 | Silverbrook |
| 8,801,418 B2 | 8/2014 | El-Siblani et al. |
| 8,805,064 B2 | 8/2014 | Ameline et al. |
| 8,815,143 B2 | 8/2014 | John et al. |
| 8,844,133 B2 | 8/2014 | Fuller |
| 8,845,316 B2 | 9/2014 | Schillen et al. |
| 8,845,953 B1 | 9/2014 | Balistreri et al. |
| 8,862,260 B2 | 10/2014 | Shkolnik et al. |
| 8,872,024 B2 | 10/2014 | Jamar et al. |
| 8,873,024 B2 | 10/2014 | Jamar et al. |
| 8,876,513 B2 | 11/2014 | Lim et al. |
| 8,877,115 B2 | 11/2014 | Elsey |
| 8,888,480 B2 | 11/2014 | Yoo et al. |
| 8,915,728 B2 | 12/2014 | Mironets et al. |
| 8,926,304 B1 | 1/2015 | Chen |
| 8,932,511 B2 | 1/2015 | Napendensky |
| 8,968,625 B2 | 3/2015 | Tan |
| 8,974,717 B2 | 3/2015 | Maguire et al. |
| 8,991,211 B1 | 3/2015 | Arlotti et al. |
| 8,992,816 B2 | 3/2015 | Jonasson et al. |
| 8,998,601 B2 | 4/2015 | Busato |
| 9,011,982 B2 | 4/2015 | Muller et al. |
| 9,031,680 B2 | 5/2015 | Napadensky |
| 9,063,376 B2 | 6/2015 | Mizumura |
| 9,064,922 B2 | 6/2015 | Nakajima et al. |
| 9,067,359 B2 | 6/2015 | Rohner et al. |
| 9,067,360 B2 | 6/2015 | Wehning et al. |
| 9,067,361 B2 | 6/2015 | El-Siblani |
| 9,073,260 B2 | 7/2015 | El-Siblani et al. |
| 9,079,357 B2 | 7/2015 | Ebert et al. |
| 9,101,321 B1 | 8/2015 | Kiesser |
| 9,149,986 B2 | 10/2015 | Huang et al. |
| 9,150,032 B2 | 10/2015 | Roof et al. |
| 9,153,052 B2 | 10/2015 | Ameline et al. |
| 9,159,155 B2 | 10/2015 | Andersen |
| 9,186,847 B2 | 11/2015 | Fruth et al. |
| 9,193,112 B2 | 11/2015 | Ohkusa et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,221,100 B2 | 12/2015 | Schwarze et al. |
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,346,217 B2 | 5/2016 | Huang et al. |
| 9,346,218 B2 | 5/2016 | Chen et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,443 B2 | 8/2016 | Ljungblad et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,486,964 B2 | 11/2016 | Joyce |
| 9,487,443 B2 | 11/2016 | Watanabe |
| 9,498,920 B2 | 11/2016 | DeSimone et al. |
| 9,498,921 B2 | 11/2016 | Teulet |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,527,272 B2 | 12/2016 | Steele |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,550,326 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |

(56) References Cited

U.S. PATENT DOCUMENTS

| | | |
|---|---|---|
| 9,592,635 B2 | 3/2017 | Ebert et al. |
| 9,604,411 B2 | 3/2017 | Rogren |
| 9,610,616 B2 | 4/2017 | Chen et al. |
| 9,616,620 B2 | 4/2017 | Hoechsmann et al. |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,656,344 B2 | 5/2017 | Kironn et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,688,027 B2 | 6/2017 | Batchelder et al. |
| 9,707,720 B2 | 7/2017 | Chen et al. |
| 9,720,363 B2 | 8/2017 | Chillscyzn et al. |
| 9,738,034 B2 | 8/2017 | Gruber et al. |
| 9,738,564 B2 | 8/2017 | Capobianco et al. |
| 9,751,292 B2 | 9/2017 | Jamar et al. |
| 9,764,513 B2 | 9/2017 | Stampfl et al. |
| 9,764,535 B2 | 9/2017 | Xie et al. |
| 9,821,546 B2 | 11/2017 | Schaafsma et al. |
| 9,862,146 B2 | 1/2018 | Driessen et al. |
| 9,862,150 B2 | 1/2018 | Chen et al. |
| 9,868,255 B2 | 1/2018 | Comb et al. |
| 9,885,987 B2 | 2/2018 | Chillscysn et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 9,919,515 B2 | 3/2018 | Daniell et al. |
| 9,950,368 B2 | 4/2018 | Lampenscherf et al. |
| 9,956,727 B2 | 5/2018 | Steele |
| 9,962,767 B2 | 5/2018 | Buller et al. |
| 9,981,411 B2 | 5/2018 | Green et al. |
| 10,000,023 B2 | 6/2018 | El-Siblani et al. |
| 10,011,076 B2 | 7/2018 | El-Siblani et al. |
| 10,061,302 B2 | 8/2018 | Jacobs et al. |
| 10,071,422 B2 | 9/2018 | Buller et al. |
| 10,124,532 B2 | 11/2018 | El-Siblani et al. |
| 10,150,254 B2 | 12/2018 | Bauman et al. |
| 10,155,345 B2 | 12/2018 | Ermoshkin et al. |
| 10,155,882 B2 | 12/2018 | Rolland et al. |
| 10,183,330 B2 | 1/2019 | Buller et al. |
| 10,183,444 B2 | 1/2019 | Campbell |
| 10,240,066 B2 | 3/2019 | Rolland et al. |
| 10,245,784 B2 | 4/2019 | Teken et al. |
| 10,317,882 B2 | 6/2019 | de Pena et al. |
| 10,336,055 B2 | 7/2019 | Das et al. |
| 10,336,057 B2 | 7/2019 | Moore et al. |
| 10,350,823 B2 | 7/2019 | Rolland et al. |
| 10,357,956 B2 | 7/2019 | Usami et al. |
| 10,406,748 B2 | 9/2019 | Honda |
| 10,612,112 B2 | 4/2020 | Yang et al. |
| 10,639,843 B2 | 5/2020 | Yuan et al. |
| 10,682,808 B2 | 6/2020 | Fujita et al. |
| 10,695,988 B2 | 6/2020 | Hanyu et al. |
| 10,717,212 B2 | 7/2020 | Parkinson et al. |
| 10,737,479 B2 | 8/2020 | El-Siblani et al. |
| 2002/0164069 A1 | 11/2002 | Nagano et al. |
| 2003/0180171 A1 | 9/2003 | Artz et al. |
| 2003/0209836 A1 | 11/2003 | Sherwood |
| 2005/0012239 A1 | 1/2005 | Nakashima |
| 2005/0019016 A1 | 9/2005 | Ishikawa et al. |
| 2006/0230984 A1 | 10/2006 | Bredt et al. |
| 2006/0248062 A1 | 11/2006 | Libes et al. |
| 2007/0063366 A1 | 3/2007 | Cunningham et al. |
| 2007/0116937 A1 | 5/2007 | Lazzerini |
| 2008/0170112 A1 | 7/2008 | Hull et al. |
| 2008/0224352 A1 | 9/2008 | Narukawa et al. |
| 2008/0241404 A1 | 10/2008 | Allaman et al. |
| 2009/0146344 A1* | 6/2009 | El-Siblani ............ B33Y 80/00 264/401 |
| 2010/0003619 A1 | 1/2010 | Das et al. |
| 2010/0196694 A1 | 8/2010 | Yamazaki et al. |
| 2010/0290016 A1 | 11/2010 | Kaehr et al. |
| 2011/0089610 A1 | 4/2011 | El-Siblani et al. |
| 2011/0101570 A1 | 5/2011 | John et al. |
| 2011/0162989 A1 | 7/2011 | Ducker et al. |
| 2011/0207057 A1 | 8/2011 | Hull et al. |
| 2012/0195994 A1 | 8/2012 | El-Siblani et al. |
| 2012/0292800 A1 | 11/2012 | Higuchi et al. |
| 2013/0008879 A1 | 1/2013 | Bichsel |
| 2013/0052332 A1* | 2/2013 | Roof ................. B41J 11/0024 427/466 |
| 2013/0140741 A1 | 6/2013 | El-Siblani et al. |
| 2014/0099476 A1 | 4/2014 | Subramanian et al. |
| 2014/0103581 A1 | 4/2014 | Das et al. |
| 2014/0200865 A1 | 7/2014 | Lehmann et al. |
| 2014/0239554 A1 | 8/2014 | El-Siblani et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0332507 A1 | 11/2014 | Fockele |
| 2014/0339741 A1 | 11/2014 | Aghababaie et al. |
| 2014/0348691 A1 | 11/2014 | Ljungblad et al. |
| 2014/0348692 A1 | 11/2014 | Bessac et al. |
| 2015/0004042 A1 | 1/2015 | Nimal |
| 2015/0004046 A1 | 1/2015 | Graham et al. |
| 2015/0056365 A1 | 2/2015 | Miyoshi |
| 2015/0086409 A1 | 3/2015 | Hellestam |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0140155 A1 | 5/2015 | Ohno et al. |
| 2015/0145174 A1 | 5/2015 | Comb |
| 2015/0158111 A1 | 6/2015 | Schwarze et al. |
| 2015/0165695 A1 | 6/2015 | Chen et al. |
| 2015/0210013 A1 | 7/2015 | Teulet |
| 2015/0224710 A1 | 8/2015 | El-Siblani |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0251351 A1 | 9/2015 | Feygin |
| 2015/0268099 A1 | 9/2015 | Craig et al. |
| 2015/0298396 A1 | 10/2015 | Chen et al. |
| 2015/0301517 A1 | 10/2015 | Chen et al. |
| 2015/0306819 A1 | 10/2015 | Ljungblad |
| 2015/0306825 A1 | 10/2015 | Chen et al. |
| 2015/0321421 A1 | 11/2015 | Ding |
| 2015/0352668 A1 | 12/2015 | Scott et al. |
| 2015/0352791 A1 | 12/2015 | Chen et al. |
| 2015/0355553 A1 | 12/2015 | Allanic |
| 2015/0375452 A1 | 12/2015 | Huang et al. |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0067921 A1 | 3/2016 | Willis et al. |
| 2016/0082662 A1 | 3/2016 | Majer |
| 2016/0082671 A1 | 3/2016 | Joyce |
| 2016/0096332 A1 | 4/2016 | Chen et al. |
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |
| 2016/0176114 A1 | 6/2016 | Tsai et al. |
| 2016/0184931 A1 | 6/2016 | Green |
| 2016/0193785 A1 | 7/2016 | Bell et al. |
| 2016/0214327 A1 | 7/2016 | Ucklemann et al. |
| 2016/0221262 A1 | 8/2016 | Das et al. |
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |

(56) References Cited

U.S. PATENT DOCUMENTS

| | | |
|---|---|---|
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126548 A1 | 5/2019 | Barnhart et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0283316 A1 | 9/2019 | Rolland et al. |
| 2019/0344381 A1 | 11/2019 | Pomerantz et al. |
| 2019/0389137 A1 | 12/2019 | Frohnmaier et al. |
| 2020/0001398 A1 | 1/2020 | Mellor et al. |
| 2020/0079008 A1 | 3/2020 | Chowdry et al. |
| 2020/0079017 A1 | 3/2020 | MacNeish, III et al. |
| 2020/0108553 A1 | 4/2020 | Rogren |
| 2020/0164437 A1 | 5/2020 | Goth et al. |
| 2020/0198224 A1 | 6/2020 | Dubelman et al. |
| 2020/0230938 A1 | 7/2020 | Menchik et al. |
| 2020/0247040 A1 | 8/2020 | Green |
| 2020/0290275 A1 | 9/2020 | Dubelman et al. |
| 2020/0307075 A1 | 10/2020 | Mattes et al. |
| 2020/0376775 A1 | 12/2020 | Das et al. |
| 2021/0046695 A1 | 2/2021 | Thompson et al. |

FOREIGN PATENT DOCUMENTS

| | | |
|---|---|---|
| CN | 103522546 A | 1/2014 |
| CN | 104175559 A | 12/2014 |
| CN | 104647752 A | 5/2015 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| DE | 102007010624 A1 | 9/2008 |
| EP | 448459 A1 | 9/1991 |
| EP | 557051 A1 | 8/1993 |
| EP | 1454831 B1 | 9/2004 |
| EP | 1852244 A2 | 11/2007 |
| EP | 1864785 A1 | 12/2007 |
| EP | 1946908 A2 | 7/2008 |
| EP | 2521524 A1 | 11/2012 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | 2002370286 A | 12/2002 |
| JP | 2003039564 A | 2/2003 |
| JP | 2004/257929 A | 9/2004 |
| JP | 20161960698 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO0100390 A1 | 1/2001 |
| WO | WO2006/077665 A1 | 7/2006 |
| WO | WO2006109355 A1 | 10/2006 |
| WO | WO2017009368 A1 | 1/2017 |
| WO | WO2017098968 A1 | 6/2017 |
| WO | WO-2017098968 A1 * | 6/2017 |
| WO | WO2017100538 A1 | 6/2017 |
| WO | WO2019/159936 A1 | 8/2019 |
| WO | WO2020033607 A1 | 2/2020 |
| WO | WO2020185553 A1 | 9/2020 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive-manufacturing-reinvented/.

Carbon, The 3D Printer for Products that Outperform, 8 Pages. Retrieved from Webpage: https://www.carbon3d.com.

DDM Systems, Disruptive Technologies for Additive Manufacturing, 2014. Retrieved on Jul. 7, 2020 from Web Link: http://www.ddmsys.com/.

Designing Buildings Wiki, Types of Brick Bonding, 6 Pages. Retrieved Mar. 25, 2021 from Webpage: https://www.designingbuildings.co.uk/wiki/Types_of_brick_bonding.

Doctor Blade with Micrometer Screw Gauge, The Tape Casting Warehouse, Inc., Morrisville PA, 6 Pages. Retrieved Mar. 23, 2021 from Webpage: https://www.drblade.com/.

Envisiontec, Advanced DLP for Superior 3D Printing, Mar. 9, 2017, 8 Pages. https://envisionte.com/wp-content/uploadds/2016/12/Why-EnvisionTEC-DLP-3D-Printing-is-Better-rebranded.pdf.

Feng et al., Exposure Reciprocity Law in Photopolymerization of Multi-Functional Acrylates and Methacrylates, Macromolecular Chemistry and Physics, vol. 208, 2007, pp. 295-306.

(56) References Cited

OTHER PUBLICATIONS

Formlabs, An Introduction to Post-Curing SLA 3D Prints, 8 Pages. Retrieved from Webpage: https://formlabs.com/blog/introduction-post-curing-sla-3d-prints.
Formlabs, Form Wash & Form Cure, 8 Pages. Retrieved from Webpage: https://formlabs.com/tools/wash-cure/.
Hafkamp et al., A Feasibility Study on Process Monitoring and Control in Vat Photopolymerization of Ceramics, Mechatronics, vol. 56, The Netherlands, Dec. 2018, pp. 220-241. Retrieved from https://doi.org/10.1016/j.mechatronics.2018.02.006.
Kudo3d, Post-Process Your SLA Prints in 4 Easy Steps, 8 Pages. Retrieved from Webpage: https://www.kudo3d.com/post-process-your-sla-prints-in-4-easy-steps/.
Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.
Lee et al., Development of a 3D Printer Using Scanning Projection Stereolithography, Scientific Reports, vol. 5, Article No. 9875, 2015, 5 pages. https://www.nature.com/articles/srep09875#s1.
Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.
Limaye, Multi-Objective Process Planning Method for Mask Projection Stereolithography, Dissertation Georgia Institute of Technology, Dec. 2007, 324 Pages.
Lithoz, 2 Pages. Retrieved from Webpage: http://www.lithoz.com/en/our-products/cleaning-station.
Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.
Micron3d, Cleaning of Printed Models, YouTube, Dec. 5, 2016, 1 Page. Retrieved from Webpage: https://www.youtube.com/watch?v=soAIrSs1iBY.
Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa Florida.
Omegasonics, Ultrasonic Cleaning of 3D Printer Parts, YouTube, Feb. 26, 2014, 1 Page. Retrieved from Webpage: https://www.youtube.com/watch?v=Gxj47OS5ohk.
Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.
Prodways Tech, Prodways Movinglight Technology Retrieved on Jul. 2, 2020 from Web Link: https://www.prodways.com/en/the-prodways-movinglight-technology/.
RAMCO Equipment Corporation, RAMCO RamTough-Fully Automated Wash/Rinse/Dry System, YouTube, Jul. 9, 2013, 1 Page. Retrieved from Webpage: https://www.youtube.com/watch?v=j8S5Oc3FVFU.
Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2 feature/02.html.
Sonics & Materials, Inc., Ultrasonic Food Cutting Equipment, Sonics & Materials, Inc., Retrieved on Jun. 26, 2020, 4 Pages. https://www.sonics.com/food-cutting.
Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.
Stevenson, Admatec's Ceramic 3D Printers, Ceramic, Metal, Fabbaloo 3D Printing News, Jan. 21, 2019, 8 Pages. Retrieved Nov. 24, 2020 from Weblink: https://www.fabbaloo.com/blog/2019/1/12/admatecs-ceramic-3d-printers.
Techmetals, Electroless Nickel (TM 117C), Engineered Metal Finishing & Performance Coatings, 1 Page. Retrieved from Webpage: https://techmetals.com/pdfs/TM_117C.pdf https://techmetals.com/tm117c-2/.
Telsonic Ultrasonics, Cutting Awning Fabrics and Sealing the Edge, The Powerhouse of Ultrasonics, 2017, 1 Page. https://www.telsonic.com/fileadmin/applications/AS_206_Cut_Seal_Markisengewebe_EN.pdf.
Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.
Tok et al., Tape Casting of High Dielectric Ceramic Substrates for Microelectronics Packaging, Journal of Materials Engineering and Performance, vol. 8, 1999, pp. 469-472. (Abstract Only) https:/link.springer.com/article/10.1361/105994999770346783.
Wikipedia, Pixel Shifting, 2 Pages. Retrieved Mar. 30, 2021 from Webpage: https://en.wikipedia.org/wiki/Pixel_shifting.
Wikipedia, Standing Wave, 11 Pages. Retrieved Mar. 17, 2021 from Webpage: https://en.wikipedia.org/wiki/Standing_wave.

\* cited by examiner

ADDITIVE MANUFACTURING SYSTEM

CROSS-REFERENCE TO RELATED APPLICATION

The present application claims priority to U.S. Provisional Patent Application Ser. No. 63/211,069, filed on Jun. 16, 2021, the contents of which of which are hereby incorporated by reference in their entirety.

FIELD

The present subject matter relates generally to an additive manufacturing apparatus, and more particularly to an additive manufacturing apparatus capable of forming larger components.

BACKGROUND

Additive manufacturing is a process in which material is built up layer-by-layer to form a component. Stereolithography (SLA) is a type of additive manufacturing process, which employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously cured layer.

In some instances, additive manufacturing may be accomplished through a "tape casting" process. In this process, a resin is deposited onto a flexible radiotransparent resin support, such as a tape or foil, that is fed out from a feed reel to a build zone. Radiant energy is produced from a radiant energy device and directed through a window to cure the resin to a component that is supported by a stage in the build zone. Once the curing of the first layer is complete, the stage and the foil are separated from one another. The foil is then advanced and fresh resin is provided to the build zone. In turn, the first layer of the cured resin is placed onto the fresh resin and cured through the energy device to form an additional layer of the component. Subsequent layers are added to each previous layer until the component is completed.

Through the use of a tape casting process, various components are generally formed in a bottom-up manner leading to the formation of generally smaller components. However, it may be beneficial to form some larger parts through a tape casting process capable of forming a component in a top-down manner.

BRIEF DESCRIPTION

Aspects and advantages of the invention will be set forth in part in the following description, or may be obvious from the description, or may be learned through practice of the invention.

In some embodiments of the present disclosure, an additive manufacturing apparatus includes a stage configured to hold a component formed by one or more layers of resin. A support plate is positioned above the stage. A radiant energy device is positioned above the stage. The radiant energy device is operable to generate and project energy in a predetermined pattern. A feed module is configured to operably couple with a first end portion of a resin support and is positioned upstream of the stage. A take-up module is configured to operably couple with a second end portion of the resin support and is positioned downstream of the stage.

In some embodiments of the present disclosure, method of operating an additive manufacturing apparatus includes depositing a layer of a resin onto a resin support. The method also includes translating the resin support to a position within a build zone. The resin is positioned below the resin support in a Z-axis direction while positioned within the build zone. The method further includes selectively curing the resin using an application of radiant energy from a radiant energy device to define a first cross-sectional layer of a component. Lastly, the method includes translating the resin support to a take-up module with a portion of the resin remaining on the resin support.

In some embodiments of the present disclosure, an additive manufacturing apparatus can include a stage configured to hold a component formed from one or more layers of a resin. A radiant energy device is operable to generate and project energy in a predetermined pattern. A support plate is at least partially positioned between the radiant energy device and the stage. A material depositor is configured to apply the resin on a resin support. The resin has a first viscosity. A viscosity modification assembly is configured to alter the first viscosity of the resin to a second viscosity.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
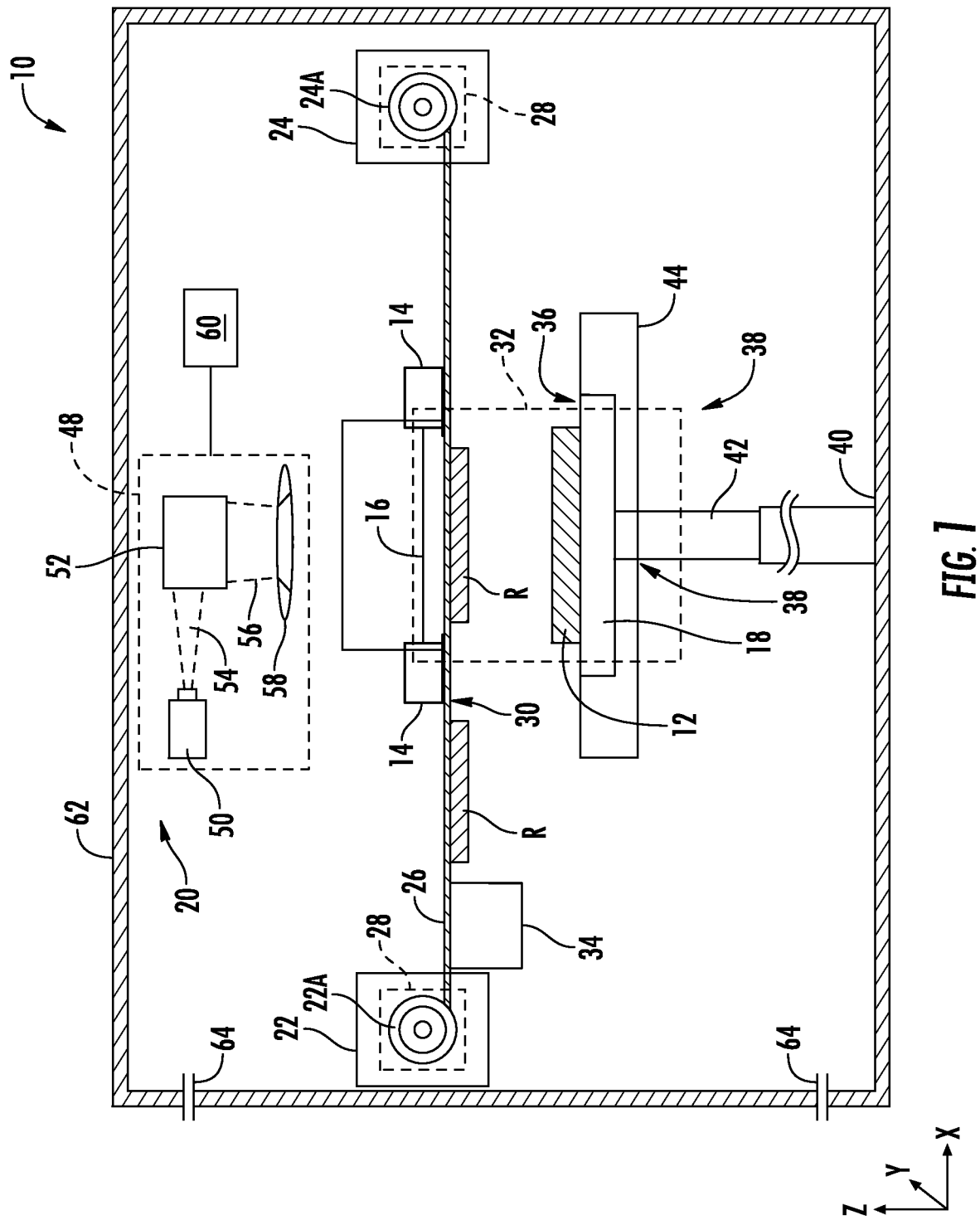
FIG. 1 is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a resin support (such as a foil or tape) movement along the manufacturing apparatus. For example, "upstream" refers to the direction from which the resin support moves and "downstream" refers to the direction to which the resin support moves. The term "selectively" refers to a component's ability to operate in various states (e.g., an ON state and an OFF state, a first state and a second state, etc.) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

The present disclosure is generally directed to an additive manufacturing apparatus that implements various manufacturing processes such that successive layers of material(s) are provided on each other to "build-up," layer-by-layer, a three-dimensional component. The successive layers generally cure together to form a monolithic component which may have a variety of integral sub-components. Although additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. In some examples, the additive manufacturing apparatus can further include a resin that is deposited as a layer having a desired thickness onto a resin support (e.g., foil, tape, or other resin support) that is fed out from a feed module. Radiant energy is used to cure the resin through the resin support. Once the curing of the first layer is complete, the stage is retracted, taking the cured material with it. In some instances, the support plate may be positioned above the stage and the stage may move downwardly as the component is built in a layer-by-layer manner. The resin support is then advanced to expose a fresh clean section, ready for additional resin to be deposited in a subsequent, new cycle.

In operation, the resin is provided in an inverted position in which the resin is below the resin support. As such, the resin may be configured to adhere to the tape without dripping. Thus, the resin may be viscous, have a chemical adhesion to the resin support, and/or be precured so that the resin sticks to the resin support. Through an inverted process, larger components may be additively manufactured.

Referring to the drawings wherein identical reference numerals denote the similar elements throughout the various views, FIG. 1 schematically illustrates an example of one type of suitable apparatus 10 for forming a component 12. The apparatus 10 can include one or more of a support plate 14, a window 16, a stage 18 that is movable relative to the window 16, and a radiant energy device 20, which, in combination, may be used to form any number (e.g., one or more) of additively manufactured components 12.

In the illustrated example, the apparatus 10 includes a feed module 22, which may include a first roller 22A, and a take-up module 24, which may include a second roller 24A, that are spaced-apart with a flexible tape or resin support 26 or another type of resin R support extending therebetween. Suitable mechanical supports (frames, brackets, etc.) may be provided for the rollers 22A, 24A and the support plate 14. The first roller 22A and/or the second roller 24A can be configured to control the speed and direction of the resin support 26 such that the desired tension and speed is maintained in the resin support 26 through a drive system 28. By way of example and not limitation, the drive system 28 can be configured as individual motors associated with the first roller 22A and/or the second roller 24A. Moreover, various components, such as motors, actuators, feedback sensors, and/or controls can be provided for driving the rollers 22A, 24A in such a manner so as to maintain the resin support 26 tensioned between the rollers 22A, 24A and to wind the resin support 26 from the first roller 22A to the second roller 24A. In other examples, the resin support 26 may be configured as a belt that translates one or more plates between the feed module 22 and the take-up module 24. Each plate may be configured to hold a layer of resin R.

In various embodiments, the window 16 is transparent and can be operably supported by the support plate 14. Further, the window 16 and the support plate 14 can be integrally formed such that one or more windows 16 are integrated within the support plate 14. Likewise, the resin support 26 is also transparent or includes transparent portions. As used herein, the terms "transparent" and "radiotransparent" refer to a material that allows at least a portion of radiant energy of a selected wavelength to pass through. For example, the radiant energy that passes through the window 16 and the resin support 26 can be in the ultraviolet spectrum, the infrared spectrum, the visible spectrum, or any other practicable radiant energy. Non-limiting examples of transparent materials include polymers, glass, and crystalline minerals, such as sapphire or quartz.

The resin support 26 extends between the feed module 22 and the take-up module 24 and defines a resin surface 30 that faces the stage 18 with the window 16 on an opposing side of the resin support 26 from the stage 18. For purposes of convenient description, when aligned with the stage 18, the resin surface 30 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the resin support 26. As used herein, the Y-axis refers to the transverse direction across the width of the resin support 26 and generally perpendicular to the machine direction. As used herein, the Z-axis refers to the stage direction that can be defined as the direction of movement of the stage 18 relative to the window 16.

For reference purposes, an area or volume immediately surrounding the location of the resin support 26 and the window 16 or transparent portion defined by the support plate 14 may be defined as a "build zone," labeled 32.

In some instances, a material depositor 34 may be positioned along the resin support 26. The material depositor 34 may be any device or combination of devices that is operable to apply a layer of resin R on the resin support 26. The material depositor 34 may optionally include a device or combination of devices to define a height of the resin R on the resin support 26 and/or to level the resin R on the resin support 26. Nonlimiting examples of suitable material deposition devices include chutes, hoppers, pumps, spray nozzles, spray bars, or printheads (e.g. inkjets). In some examples, a doctor blade may be used to control the thickness of resin R applied to the resin support 26 as the resin support 26 passes the material depositor 34.

The resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The uncured resin R may be provided in solid (e.g. granular) or liquid form, including a paste or slurry.

Furthermore, the resin R can have a relatively high viscosity that will not "slump" or run off during the build process. The composition of the resin R may be selected as desired to suit a particular application. Mixtures of different compositions may be used. The resin R may be selected to have the ability to out-gas or burn off during further processing, such as a sintering process.

Additionally or alternatively, the resin R may be selected to be a viscosity reducible composition. These compositions reduce in viscosity when a shear stress is applied or when they are heated. For example, the resin R may be selected to be shear-thinning such that the resin R exhibits reduced viscosity as an amount of stress applied to the resin R increases. Additionally or alternatively, the resin R may be selected to reduce in the viscosity as the resin R is heated.

The resin R may incorporate a filler. The filler may be pre-mixed with resin R, then loaded into the material depositor 34. The filler includes particles, which are conventionally defined as "a very small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon via application of sufficient energy. For example, fusibility is a characteristic of many available powders including but not limited to polymeric, ceramic, glass, and metallic. The proportion of filler to resin R may be selected to suit a particular application. Generally, any amount of filler may be used so long as the combined material is capable of flowing and being leveled, and there is sufficient resin R to hold together the particles of the filler in the cured state. Moreover, the filler may be used to obtain a predetermined viscosity of the resin R such that the resin R maintains its position and thickness on the resin support 26.

The stage 18 is a structure defining a planar surface 36, which is capable of being oriented parallel to the resin surface 30 or the X-Y plane. Various devices may be provided for moving the stage 18 relative to the window 16 parallel to the Z-axis direction. For example, as illustrated in FIG. 1, the movement may be provided through an actuator assembly 38 that may be coupled with a static support 40. In some embodiments, the actuator assembly 38 may include a vertical actuator 42 between the stage 18 and the static support 40 that allows for movement of the stage 18 in a first, vertical direction (e.g., along the Z-axis direction). The actuator assembly 38 may additionally or alternatively include a lateral actuator 44 between the stage 18 and the vertical actuator 42 and/or the static support 40 that allows for movement in a second, horizontal direction (e.g., along the X-axis direction). The actuator assembly 38 may include any device practicable of moving the stage 18 in the first and/or second direction, such as ballscrew electric actuators, linear electric actuators, pneumatic cylinders, hydraulic cylinders, delta drives, belt systems, or any other practicable device.

The radiant energy device 20 may be configured as any device or combination of devices operable to generate and project radiant energy at the resin R in a suitable pattern and with a suitable energy level and other operating characteristics to cure the resin R during the build process. For example, as shown in FIG. 1, the radiant energy device 20 may include a projector 48, which may generally refer to any device operable to generate a radiant energy predetermined patterned image of suitable energy level and other operating characteristics to cure the resin R. As used herein, the term "patterned image" refers to a projection of radiant energy comprising an array of one or more individual pixels. Non-limiting examples of patterned image devices include a DLP projector or another digital micromirror device, a two-dimensional array of LEDs, a two-dimensional array of lasers, and/or optically addressed light valves. In the illustrated example, the projector 48 includes a radiant energy source 50 such as a UV lamp, an image forming apparatus 52 operable to receive a source beam 54 from the radiant energy source 50 and generate a patterned image 78 to be projected onto the surface of the resin R, and optionally focusing optics 58, such as one or more lenses.

The image forming apparatus 52 may include one or more mirrors, prisms, and/or lenses and is provided with suitable actuators, and arranged so that the source beam 54 from the radiant energy source 50 can be transformed into a pixelated image 78 in an X-Y plane coincident with the surface of the resin R. In the illustrated example, the image forming apparatus 52 may be a digital micro-mirror device.

The projector 48 may incorporate additional components, such as actuators, mirrors, etc. configured to selectively move the image forming apparatus 52 or other part of the projector 48 with the effect of rastering or shifting the location of the patterned image 78 on the resin surface 30. Stated another way, the patterned image 78 may be moved away from a nominal or starting location.

In addition to other types of radiant energy devices 20, the radiant energy device 20 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 50 and a beam steering apparatus. The radiant energy source 50 may include any device operable to generate a beam of suitable power and other operating characteristics to cure the resin R. Non-limiting examples of suitable radiant energy sources 50 include lasers or electron beam guns.

The apparatus 10 may be operably coupled with a computing system 60. The computing system 60 in FIG. 1 is a generalized representation of the hardware and software that may be implemented to control the operation of the apparatus 10, including some or all of the stage 18, the drive system 28, the radiant energy device 20, the actuator assembly 38, actuators, and the various parts of the apparatus 10 described herein. The computing system 60 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Optionally, the components of the apparatus 10 may be surrounded by a housing 62, which may be used to provide a shielding or inert gas (e.g., a "process gas") atmosphere using gas ports 64. Optionally, pressure within the housing 62 could be maintained at a desired level greater than or less than atmospheric. Optionally, the housing 62 could be temperature and/or humidity controlled. Optionally, ventilation of the housing 62 could be controlled based on factors such as a time interval, temperature, humidity, and/or chemical species concentration. In some embodiments, the housing 62 can be maintained at a pressure that is different than an atmospheric pressure.

Figure 2:
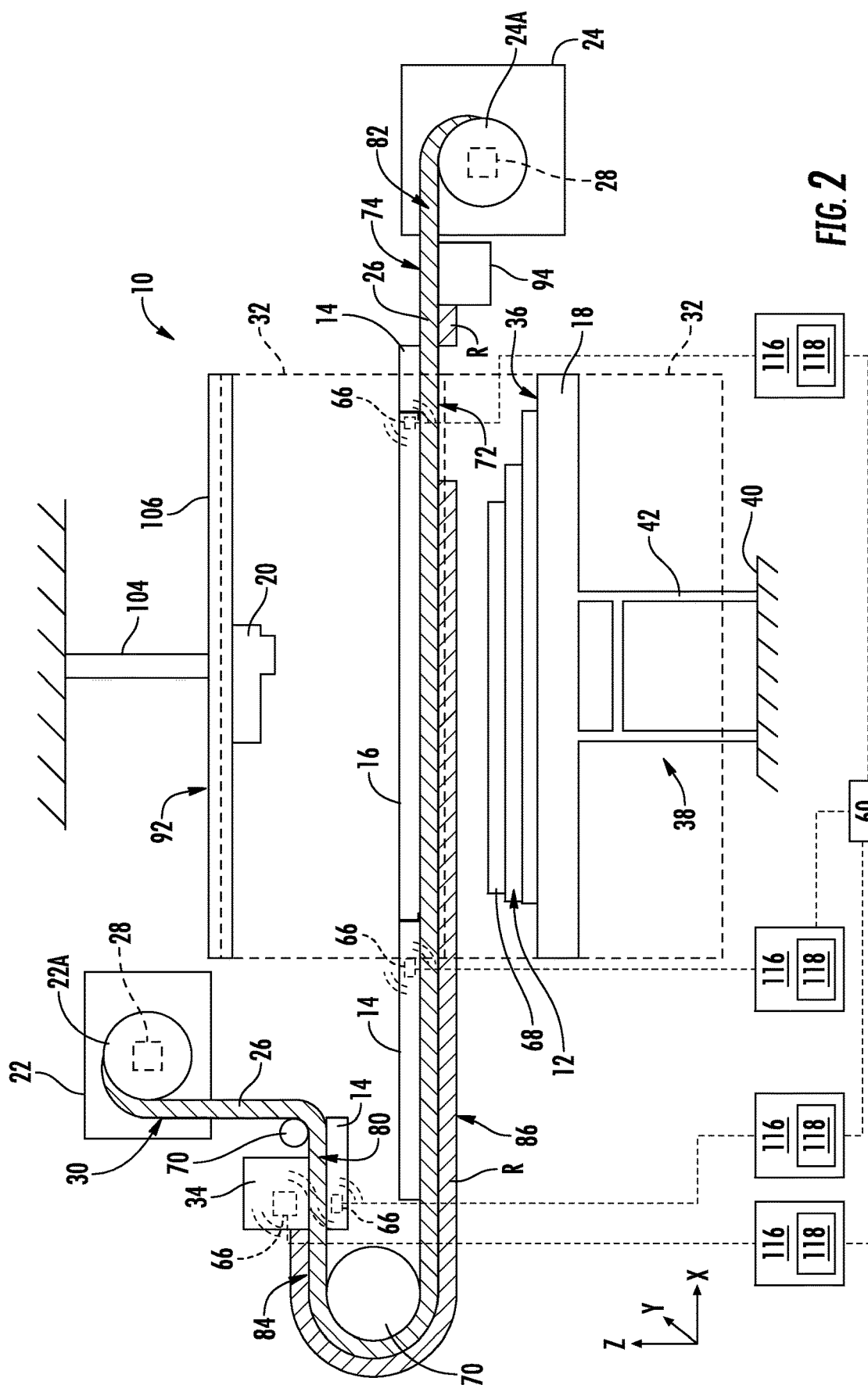
FIG. 2 is a front schematic view of the additive manufacturing apparatus having a stage positioned below a resin support in accordance with various aspects of the present disclosure.

Referring to FIG. 2, a schematic view is provided of an additive manufacturing apparatus 10 capable of producing one or more components 12 through a tape casting process in accordance with exemplary embodiments of the present disclosure. It will be understood that, as a precursor to producing a component 12 and using the apparatus 10, the component 12 is software modeled as a stack of planar layers arrayed along the Z-axis direction. Depending on the type of curing method used, each layer may be divided into a grid of pixels. In some examples, the pixels may have dimensions in the range of 10-100 micrometers (µm).

In the embodiment of FIG. 2, the feed module 22 may be operably coupled with a first end portion of the resin support 26 and positioned upstream of the stage 18. A second end portion of the resin support 26 may be operably coupled with the take-up module 24 and may be positioned downstream of the stage 18. One or more pivot devices 70 may be operably coupled with the support plate 14 (and/or with any other structure within the apparatus 10), which include any number of portions. The pivot devices 70 may be configured to redirect the resin support 26 between the feed module 22 and the take-up module 24. In some embodiments, the resin R may be deposited on a first surface 72 of the resin support 26 through the material depositor 34 while a second surface 74 of the resin support 26 may contact the window 16 and/or the support plate 14.

In some examples, the material depositor 34 may be positioned downstream of the feed module 22 and at least partially upstream of a pivot device 70 configured to alter a relationship of the resin relative to the resin support 26 in a Z-axis direction such that the resin R is deposited on the resin support 26 upstream of at least one of the pivot devices 70 such that gravity may assist in depositing the resin R on the resin support 26. The resin R may then be translated about the at least one of the pivot device 70 and into the build zone 32 on an opposing side of the support plate 14. As such, the resin R may be deposited on the first surface 72 when the first surface 72 is an upward or upper surface of the resin support 26 that becomes a bottom, inverted surface once the resin R is translated about the at least one of the pivot device 70. As used herein, "inverted" is any component or material that is positioned below a surface supporting the component or material in the Z-axis direction.

In some examples, a first portion 80 of the resin support 26 upstream of one or more pivot devices 70 and a second portion 82 of the resin support 26 downstream of the one or more pivot devices 70. A first segment 84 of the resin R may be supported by the first portion 80 of the resin support 26 while a second segment 86 of resin R may be supported by the second portion 82 of the resin support 26. The second segment of resin R may be any portion of the resin R that is angularly offset from the first segment 84 of resin R in any direction. In various instances, the second segment 86 of the resin R may be inverted and extend a length that is greater than a length of the stage 18 in the X-axis direction. In various embodiments, the resin R may be inverted for a predefined amount of time in which the resin R is capable of maintaining its position on the resin support 26 while being inverted. For example, the resin R may be configured to maintain its inverted position for a minimum amount of time of 10 seconds, 30 seconds, 60 seconds, and/or any other predefined amount of time.

With reference to FIG. 2, in various embodiments, a viscosity modification assembly 66 may be integrated within the support plate 14 and/or otherwise operably coupled with the resin support 26. The viscosity modification assembly 66 may be configured to apply a shearing stress to the resin R to alter (e.g., reduce) a viscosity of the resin R. Additionally or alternatively, the viscosity modification assembly 66 may be configured to heat the resin R to alter the viscosity of the resin R.

In some embodiments, the viscosity modification assembly 66 may be configured to mechanically vibrate a portion of the support plate 14 and/or the window to create a shearing stress on the resin R. For example, the viscosity modification assembly 66 may include a movement device 114 (e.g., a transducer) that is operably coupled with the support plate 14, the window, or any other module of the apparatus 10 that is then transferred to the resin R. The movement device 114 may be configured to vibrate at least a portion of the support plate 14, the window, or any other module of the apparatus 10 that is then transferred to the resin R. Additionally and/or alternatively, the movement device 114 may be configured to convert electrical energy to ultrasonic mechanical pressure waves that are transferred to the resin R. For instance, the movement device 114 may be in the form of an ultrasonic vibrating device, such as one utilizing a piezoelectric transducer. In other embodiments, the viscosity modification assembly 66, in addition to or in lieu of the transducer, may include, alone or in conjunction with one or the other, a fluid, an acoustic, a motor (e.g., offset cam), a reciprocating piston, or any other movement device 114.

The movement device 114 may be operably coupled with a control system 116 that may be further coupled and/or integrated within the computing system 60. The control system 116 may include a signal generator 118 that supplies an electric impulse to the movement device 114, the voltage of which can be varied at different frequencies and with different waveshapes. The signal may, for example, be a pure sinusoidal wave or may be modulated with one or more other frequencies. Alternatively, the signal may be a stepped or spiked pulse. In some embodiments, the signal generator 118 transmits a signal of between 20-80 kHz. For example, the signal is at about 60 kHz. The signal generator 118 may, for example, transmit a constant amplitude signal at a constant frequency, or alternate one or both of these parameters. A power level can be selected as a percentage of maximum power.

In other embodiments, the viscosity modification assembly 66 may be configured to create a shearing stress on the resin R through other configurations without departing from the scope of the present disclosure. For example, the viscosity modification assembly 66 may be configured as a probe that may be adjacent and in physical contact with the resin support 26, the resin on the resin support 26, and/or any other module that may relay the shearing stress to the resin R on the resin support 26. Additionally or alternatively, the viscosity modification assembly 66 may be configured as an ultrasonic or vibration plate that may be operably coupled with the resin support 26 and/or any other module of the apparatus 10 that may provide the shearing stress to the resin R on the resin support 26.

It will be appreciated that the operations (e.g., amount of shear thinning) of the viscosity modification assembly 66 may be adjusted based on the design of the apparatus 10 such that the shear thinning may be configured to not interfere with the component 12 and/or the build process. For example, if the shear thinning is too aggressive, it may be possible that the resin may fall off the resin support 26 in the inverted position. As such, the viscosity modification assembly 66 may be utilized with predefined resins, part geometries, parameter sets, and so on.

With further reference to FIG. 2, in various embodiments, a gasket 120 may be positioned between the window 16 and the support plate 14 to isolate movement of each of the window 16 and the support plate 14 from one another. In various examples, the gasket 120 may be formed from a motion attenuating material, such as any of a wide variety of resilient elastomers including, but not limited to, materials containing natural rubber and silicone.

Moreover, in various embodiments, the viscosity modification assembly 66 may be configured to target specific locations in the build zone 32. As such, by taking advantage of constructive and destructive wave interference vibration caused by the viscosity modification assembly 66, the apparatus 10 can target specific locations within the build zone 32. In such instances, the gasket 120 may assist in separating the specific locations in the build zone 32.

As provided herein, in some instances, the viscosity modification assembly 66 may additionally or alternatively be capable of producing heat to alter the viscosity of the resin R. For example, fast heating processes, such as dielectric or microwave heating, can be used to avoid exposing the resin R to a long heating cycle before the temperature of use is reached.

In some embodiments, the viscosity modification assembly 66 may be integrated within and/or operably coupled with the stage 18 such that the printed component 12 itself can induce the shearing stress in the resin R to cause the viscosity of the resin R change.

Figure 3:
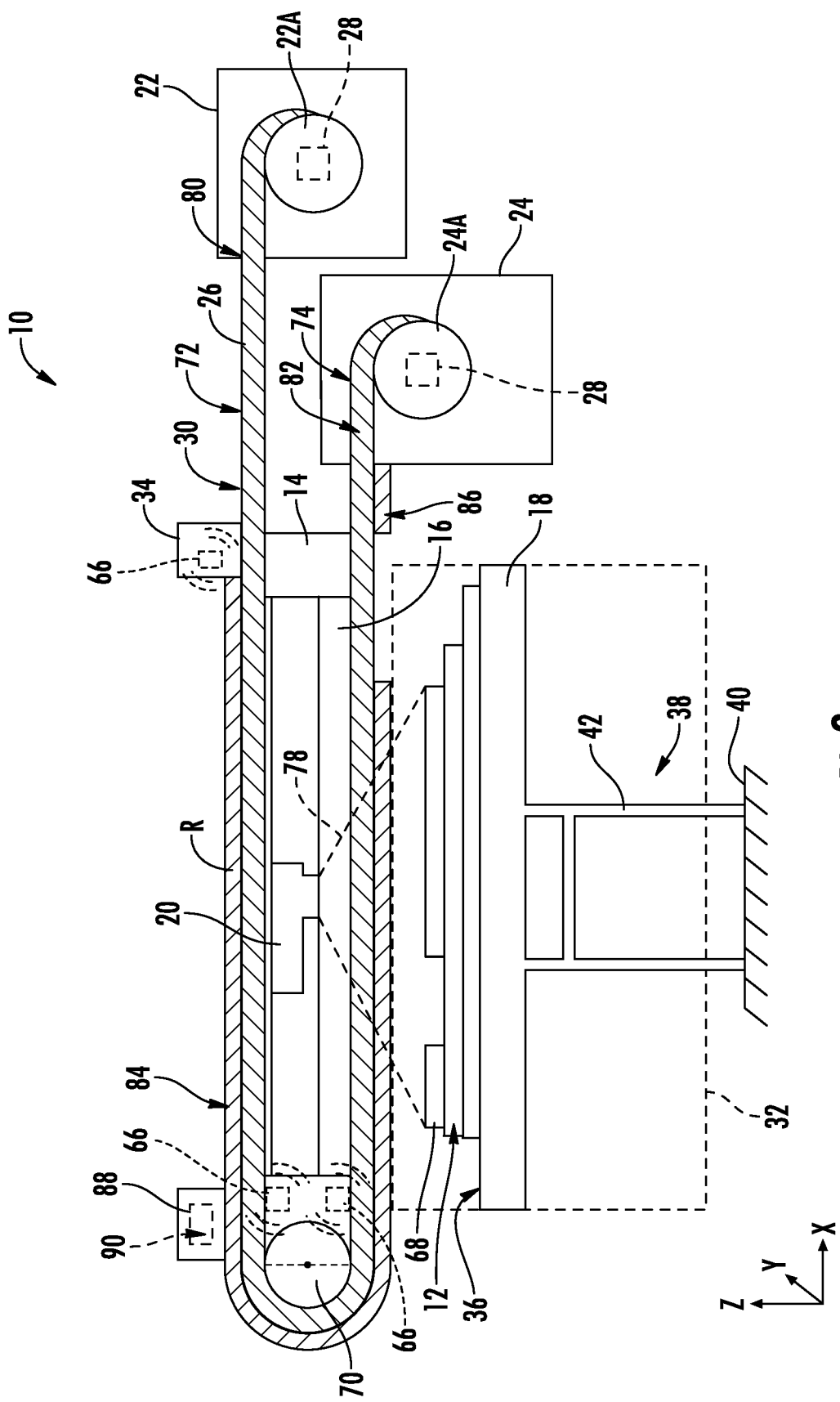
FIG. 3 is a front schematic view of the additive manufacturing apparatus having a stage positioned below a resin support in accordance with various aspects of the present disclosure.

Referring to FIG. 3, a schematic view is provided of an additive manufacturing apparatus 10 capable of producing one or more top-down components 12 through a tape casting process in accordance with exemplary embodiments of the present disclosure. It will be understood that, as a precursor to producing a component 12 and using the apparatus 10, the component 12 is software modeled as a stack of planar layers arrayed along the Z-axis direction. Depending on the type of curing method used, each layer may be divided into a grid of pixels. In some examples, the pixels may have dimensions in the range of 10-100 micrometers (µm).

In the embodiment of FIG. 3, the feed module 22 may be operably coupled with a first end portion of the resin support 26 and positioned upstream of the stage 18. A second end portion of the resin support 26 may be operably coupled with the take-up module 24 and may be positioned downstream of the stage 18. A pivot device 70 may be operably coupled with the support plate 14 and/or with any other structure within the apparatus 10, such as a build support that braces and/or forms the support plate 14 and/or a radiant energy source housing. In various embodiments, the pivot device 70 may be rotatable about an axis that is generally parallel to an axis of rotation of the first roller 22A and/or the second roller 24A. The pivot device 70 may be configured to redirect the resin support 26 from the feed module 22 to the take-up module 24. In some embodiments, the resin R may be deposited on a first surface 72 of the resin support 26 through the material depositor 34 while a second surface 74 of the resin support 26 may contact the window 16 and/or the support plate 14.

In some examples, the material depositor 34 may be positioned on an opposite side of the support plate 14 from the stage 18 such that the resin R is deposited on the resin support 26 upstream of the pivot device 70 such that gravity may assist in depositing the resin R on the resin support 26. The resin R may then be translated about the pivot device 70 and into the build zone 32 on an opposing side of the support plate 14. As such, the resin R may be deposited on the first surface 72 when the first surface 72 is an upward or upper surface of the resin support 26 that becomes a bottom, inverted surface once the resin R is translated about the pivot device 70.

In various embodiments, the resin R may be inverted between the pivot device 70 and the take-up module 24. Once the resin R is inverted and positioned within the build zone 32, a working surface of the stage 18 and/or the component 12 retained by the stage 18 contacts the resin R to define a selected layer increment. The layer increment is defined by some combination of the thickness of the deposited resin R and the operation of the stage 18. For example, the stage 18 could be positioned such that the stage 18 for new components 12 or the existing surface for components 12 in process is just touching the deposited resin R or the stage 18 could be used to compress and displace the resin R to positively define the layer increment. The layer increment affects the speed of the additive manufacturing process and the resolution of the component 12. The layer increment can be variable, with a larger layer increment being used to speed the process in portions of the component 12 not requiring high accuracy, and a smaller layer increment being used where higher accuracy is required, at the expense of process speed.

The patterned image may be transmitted through the window 16 supported by the support plate 14 with the window 16 positioned below the radiant energy device 20. As each layer 68 of the component 12 is cured, the stage 18 may be further lowered such that a component 12 is formed in a top-down manner. It will be appreciated that in some embodiments, in addition to or in lieu of the stage movement, the support plate 14 and the resin support 26 may be translated up in the Z-axis direction.

In some examples, the radiant energy device 20 may be positioned between a first portion 80 of the resin support 26 upstream of the pivot device 70 and a second portion 82 of the resin support 26 downstream of the pivot device 70. A first segment 84 of resin R may be supported by the first portion 80 of the resin support 26 while a second segment 86 of resin R may be supported by the second portion 82 of the resin support 26. The second segment of resin R may be any portion of the resin R that is angularly offset from the first segment 84 of resin R in any direction. In various instances, the second segment 86 of the resin R may be inverted and extend a length that is greater than a length of the stage 18 in the X-axis direction. For example, the second segment 86 of the resin R may be inverted for a distance of 0.5 feet, 1 foot, 2 feet, 5 feet, 10 feet, 50 feet, 75 feet, 100 feet, or any other distance.

In various embodiments, the resin R may be inverted for a predefined amount of time in which the resin R is capable of maintaining its position on the resin support 26 while being inverted. For example, the resin R may be configured to maintain its inverted position for a minimum amount of time of 10 seconds, 30 seconds, 60 seconds, and/or any other predefined amount of time.

In some embodiments, a precuring assembly 88 may be at least partially upstream of the pivot device 70 and/or in any other location along the resin support 26. The precuring assembly 88 may be configured to at least partially cure the resin R prior to the resin R being translated about the pivot device 70. For example, the precuring assembly 88 may include a gross radiation source 90 that alters the resin R from a first state to a second state that alters a characteristic, such as the viscosity, or the resin R so that the resin R may not drip while being in the inverted position. Additionally or alternatively, the resin R may have a chemical adhesion to the resin support 26 so that the resin R sticks to the tape.

In various examples, the precuring assembly 88 may pre-cure the resin from the top (e.g., a position on the first side of the resin support) or pre-cure from a bottom (e.g., a position on an opposing, second side of the resin support). In various instances, if the resin is pre-cured from the bottom, an adhesion of the resin to the resin support 26 may be increased.

Figure 4:
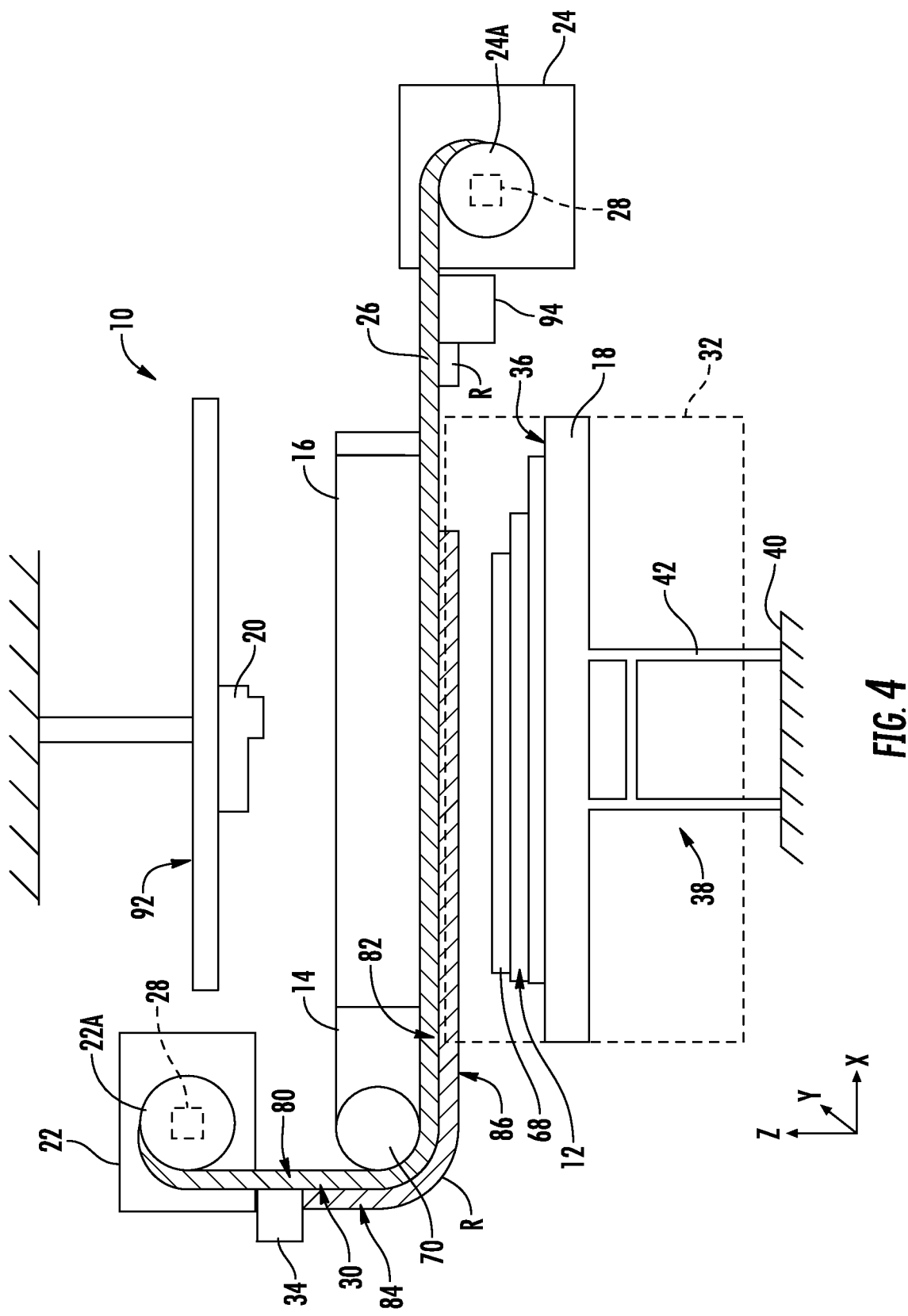
FIG. 4 is a front schematic view of the additive manufacturing apparatus having the stage positioned below the resin support in accordance with various aspects of the present disclosure.

Referring to FIG. 4, a schematic view is provided of an additive manufacturing apparatus 10 capable of producing top-down components 12 through a tape casting process in accordance with exemplary embodiments of the present disclosure. As provided herein, the feed module 22 may be operably coupled with a first end portion of the resin support 26 and positioned upstream of the stage 18. A second end portion of the resin support 26 may be operably coupled with the take-up module 24 and may be positioned downstream of the stage 18.

In the exemplary embodiment illustrated in FIG. 4, the first roller 22A can be positioned above the support plate 14, the material depositor 34, and/or the pivot device 70 in the Z-axis direction. In such instances, the material depositor 34 may be configured to apply the resin R to the first portion 80 of the resin support 26 with the resin support 26 in a non-parallel or generally perpendicular position relative to the second portion 82 of the resin support 26 positioned downstream of the pivot device 70 in the X-axis direction. As such, a first segment 84 of resin R may be provided on the first portion of the resin support 26 with the first segment 84 of resin R and the first portion 80 of the resin support 26 being positioned upstream of the pivot device 70. Likewise, the second segment 86 of resin R may be provided on the second portion 82 of the resin support 26 downstream of the pivot device 70. The first segment 84 of the resin R may be positioned adjacently to the resin support 26 in the X-axis direction and the second segment 86 of resin R may be positioned below the second portion 82 of the resin support 26. As such, the resin R may be oriented vertically on the first portion 80 of the resin support 26 while the second segment 86 of resin R is inverted on the second portion 82 of the resin support 26.

As illustrated in FIG. 4, the radiant energy device 20 may be positioned above the support plate 14 and the window 16 positioned within a portion of the support plate 14. In various instances, the radiant energy may be capable of movement relative to the support plate 14 and/or the stage 18. For example, a movement assembly 92 may be configured to selectively move the radiant energy device 20 in any desired direction with the effect of rastering or shifting the location of a patterned image 78 relative to the window 16. Stated another way, the patterned image 78 may be moved away from a nominal or starting location. This permits a single radiant energy device 20 to cover a larger build area, for example. This type of image projection may be referred to herein as a "tiled image". Additionally or alternatively, the apparatus 10 may include a plurality of radiant energy devices 20 that are operably coupled with the build zone 32. Each of the plurality of radiant energy devices 20 may be configured to translate above the window 16 and/or the support plate 14. Further, in some embodiments, optics 58 (FIG. 1) may be optically coupled with the one or more radiant energy devices 20. In such instances, at least one of the one or more radiant energy devices 20 and/or the optics 58 may translate along the Y-axis and/or otherwise more through the movement assembly 92 to produce patterned images 78 on various portions of the resin R.

In the embodiment illustrated in FIG. 4, a resin reclamation system 94 may be positioned downstream of the stage 18 and upstream of the second roller 24A. In some embodiments, the reclamation system 94 may be configured to remove at least a portion of uncured resin R that remains on the resin support 26 after the resin support 26 is removed from the build zone 32. For example, the reclamation system 94 may include a wiper assembly, a blade assembly, and/or any other removal assembly and a reservoir for collecting the resin R that is removed from the resin support 26.

Figure 5:
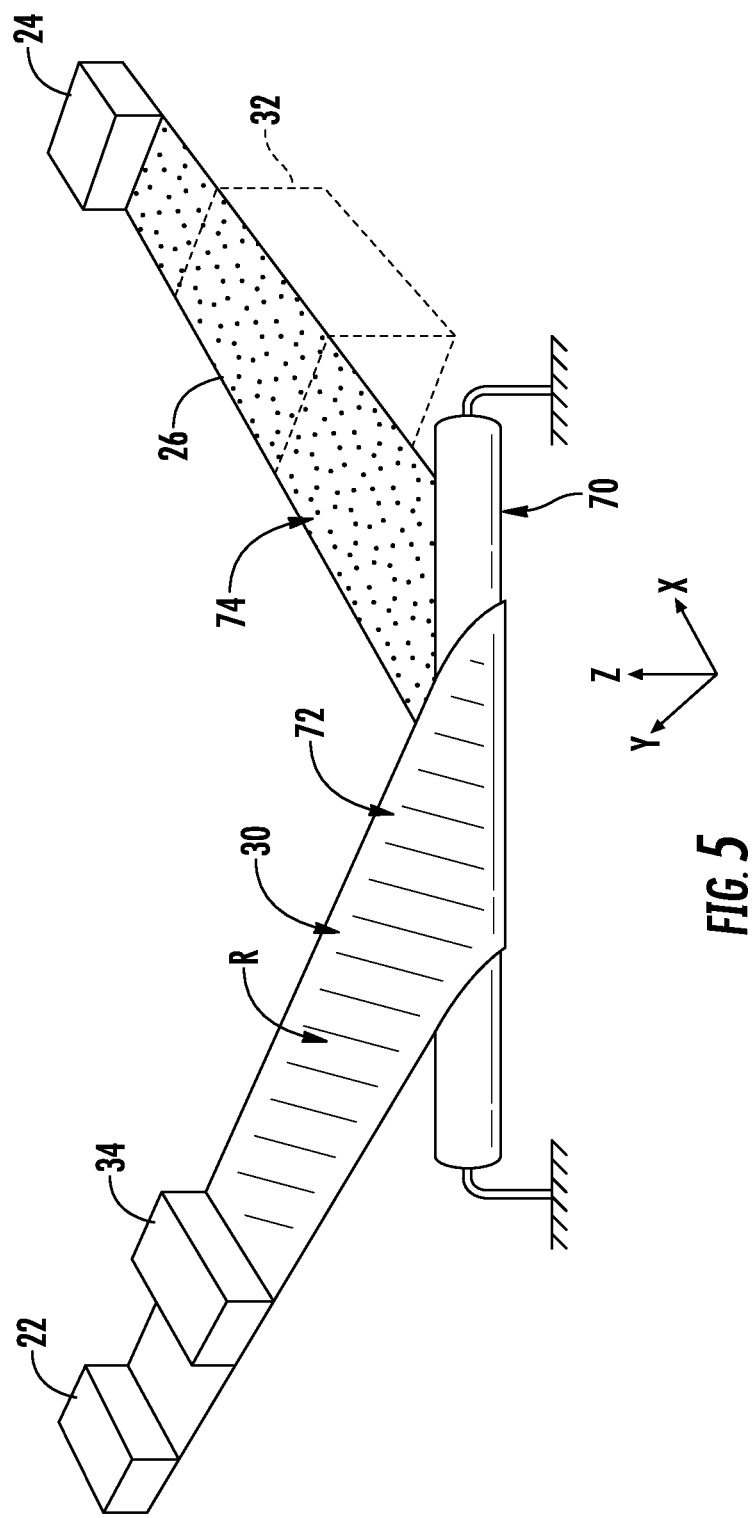
FIG. 5 is a front perspective view of the additive manufacturing apparatus having a pivot device in accordance with various aspects of the present disclosure.

Referring to FIG. 5, in some embodiments, the pivot device 70 may be configured to alter a translation direction of the resin support 26 in the X-Y plane. For example, as illustrated, the resin support may be translated in a direction that is generally parallel to the Y-axis direction upstream of the pivot device 70 and in a direction that is generally parallel to the X-axis direction downstream of the pivot device. In some embodiments, the resin R may be deposited on the first surface 72 of the resin support 26 through the material depositor 34 upstream of the pivot device 70. As the resin support 26 translates along the pivot device 70, the second surface 74 of the resin support 26 may make contact the pivot device 70.

Figure 6:
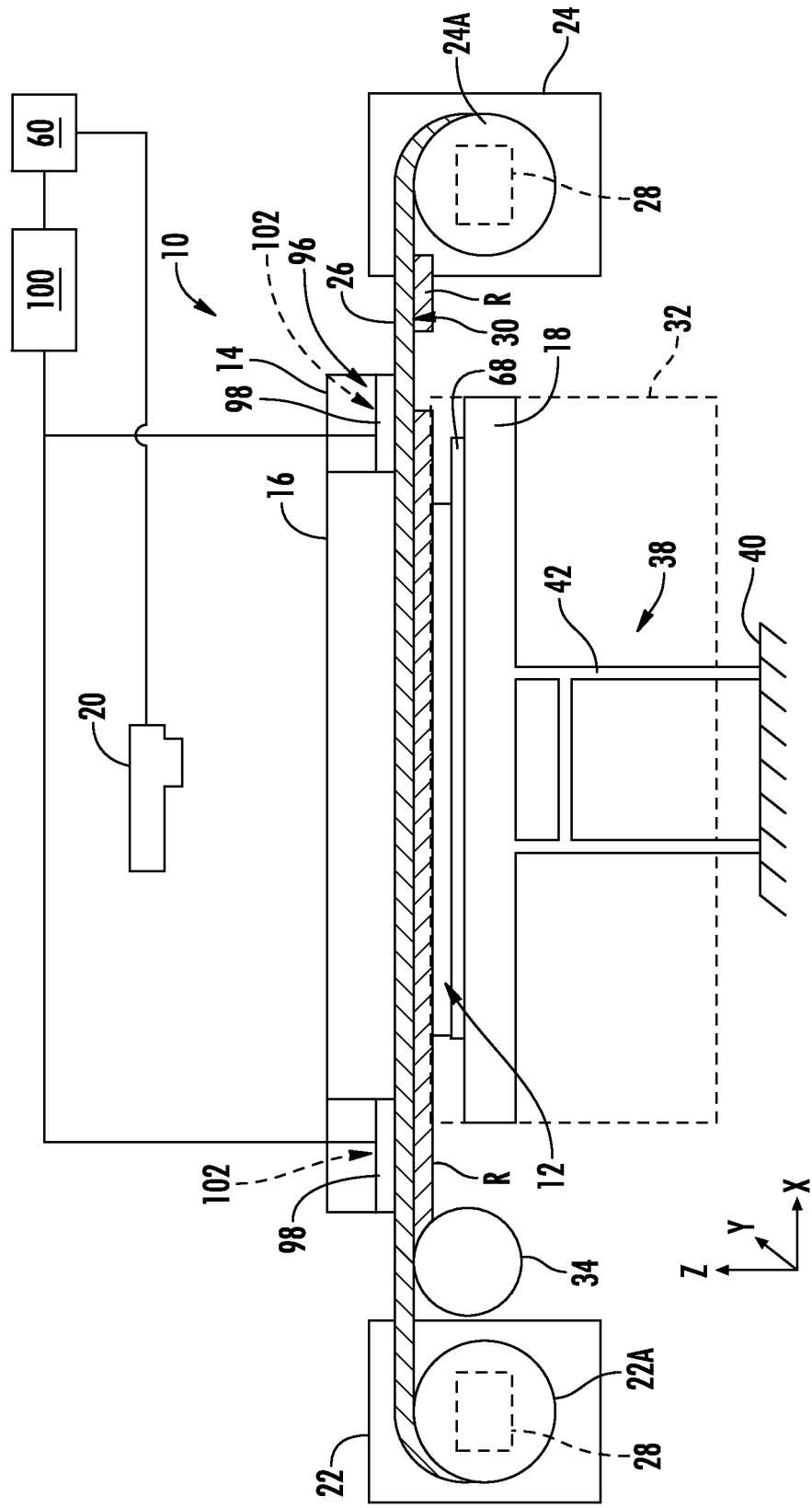
FIG. 6 is a front schematic view of the additive manufacturing apparatus having the stage positioned below the resin support in accordance with various aspects of the present disclosure.

Referring to FIG. 6, a schematic view is provided of an additive manufacturing apparatus 10 capable of producing top-down components 12 through a tape casting process in accordance with exemplary embodiments of the present disclosure. As provided herein, the feed module 22 may be operably coupled with a first end portion of the resin support 26 and positioned upstream of the stage 18 and a second end portion of the resin support 26 may be operably coupled with the take-up module 24 and may be positioned downstream of the stage 18. In various embodiments, such as the one illustrated in FIG. 6, the first roller 22A and the second roller 24A are each at least partially positioned below the support plate 14 in the Z-axis direction.

In some embodiments, the material depositor 34 is positioned downstream of the first roller 22A and upstream of the stage 18. The material depositor 34 may further be positioned below the resin support 26 in the Z-axis direction. The material depositor 34 may include a transfer roller that is configured to apply the resin R to the resin support 26 upstream of the stage 18. The transfer roller is configured to deposit a resin R to the first surface 72 of the resin support 26 through any practicable manner as the resin support 26 is translated.

With further reference to FIG. 6, a resin support interaction device 96 may be provided within the apparatus 10 and operably coupled with the support plate 14 (and/or with any other component of the apparatus 10). In various embodiments, the resin support interaction device 96 can include one or more pneumatic actuation zones 98 that is configured to selectively interact with the resin support 26 by producing a force on the second surface 74 of the resin support 26. For example, the one or more pneumatic actuation zones 98 may apply a negative pressure on the second surface 74 of the resin support 26 to produce a suction or vacuum on the resin support 26. Accordingly, the resin support interaction device 96 may be free from contact with the resin R that is on the resin support 26. The negative pressure may retain the resin support 26 in a desired position relative to the support plate 14. As used herein, a "negative" pressure is any pressure that is less than an ambient pressure proximate to one or more pneumatic actuation zones 98 such that fluid may be drawn into the one or more pneumatic actuation zones 98. Conversely, a "positive" pressure is any pressure that is greater than an ambient pressure proximate to one or more pneumatic actuation zones 98 such that fluid may be exhausted from the one or more pneumatic actuation zones 98. Further, a "neutral" pressure is any pressure that is generally equal to an ambient pressure proximate to one or more pneumatic actuation zones 98.

In some examples, the pneumatic actuation zones 98 may be fluidly coupled with a pneumatic assembly 100 through various hoses and one or more ports. The pneumatic assembly 100 may include any device capable of providing a vacuum/suction and/or pushing a fluid, such as air or a process gas (e.g., nitrogen or argon), through the one or more pneumatic actuation zones 98. For instance, the pneumatic assembly 100 may include a pressurized fluid source that includes a compressor and/or a blower. The pneumatic assembly 100 may additionally or alternatively include any assembly capable of altering a pressure, such as a venturi vacuum pump. In some embodiments, one or more valves and/or switches may be coupled with the pneumatic assembly 100 and the one or more pneumatic actuation zones 98. The one or more valves and/or switches are configured to regulate a pressure to each of the one or more pneumatic actuation zones 98.

In various embodiments, the one or more pneumatic actuation zones 98 may define one or more apertures 102 of any size and shape for interacting with the resin support 26. For instance, the apertures 102 may be any number and combination of holes, slits, or other geometric shapes defined by any component of the additive manufacturing apparatus 10, such as a casing of the resin support interaction device 96. Additionally or alternatively, the apertures 102 may be defined by a portion of the casing being formed from a porous material, or through any other assembly in which a fluid may be moved from a first side of the casing to a second side of the casing to interact with the resin support 26.

In some instances, the one or more pneumatic actuation zones 98 may extend along various portions of the support plate. Further, in some instances, the one or more pneumatic actuation zones 98 may extend along substantially all of the support plate 14. In operation, the one or more pneumatic actuation zones 98 may keep and/or at least partially prevent gravity from stretching the resin support 26 away from the support plate 14 and/or the window 16 beyond a predefined amount.

Figure 7:
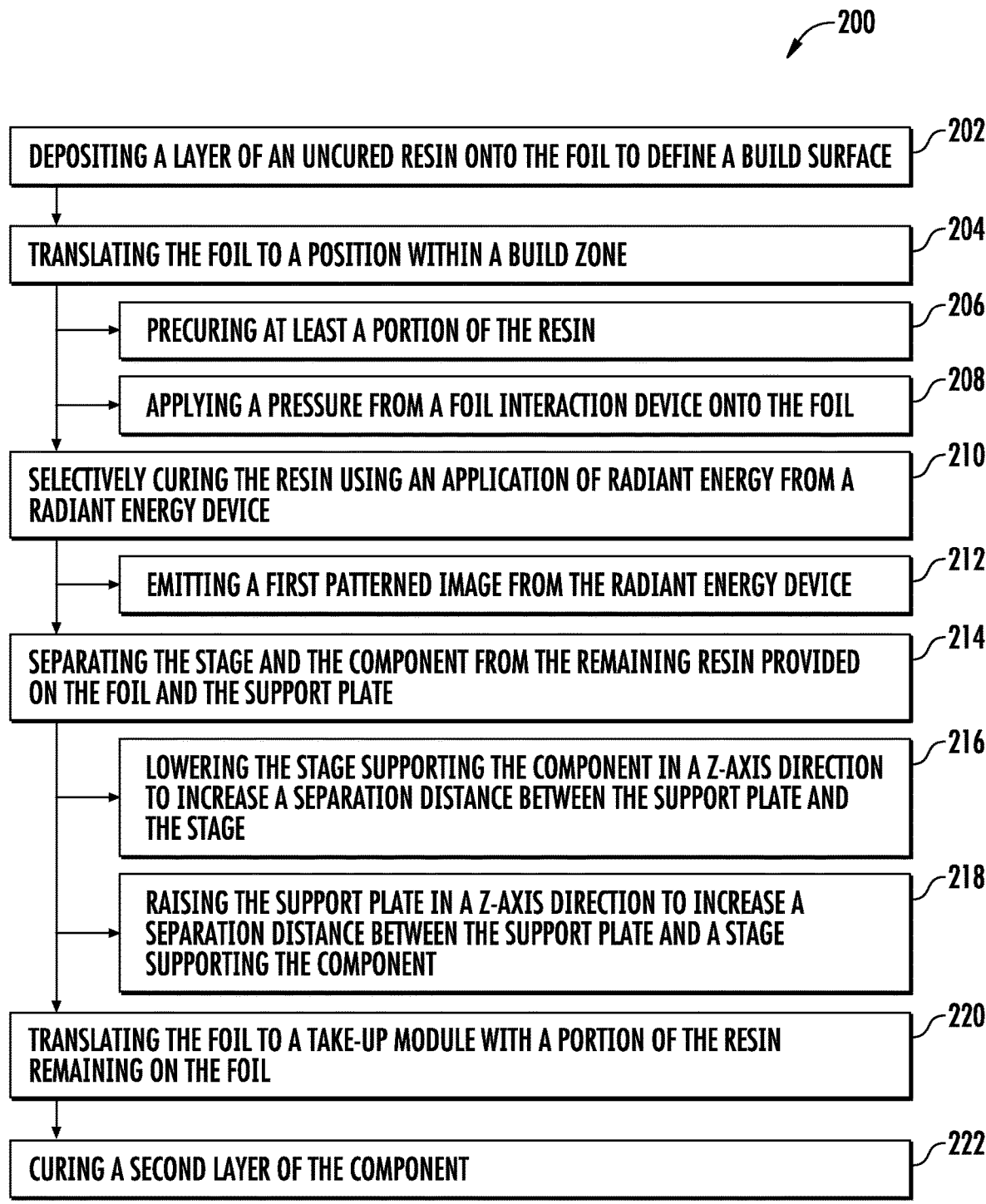
FIG. 7 is a method of operating the manufacturing apparatus in accordance with various aspects of the present disclosure.

Now that the construction and configuration of the additive manufacturing apparatus 10 has been described according to various examples of the present subject matter, a method 200 for operating an additive manufacturing apparatus 10 is provided in conjunction with illustrations of the various steps in FIG. 7. The method 200 can be used to operate the additive manufacturing apparatus 10 or any other suitable additive manufacturing apparatus 10. It should be appreciated that the example method 200 is discussed herein only to describe example aspects of the present subject matter and is not intended to be limiting. Any of the steps within FIGS. 7-11 may be omitted or rearranged in any other order without departing from the scope of the present disclosure.

Figure 8:
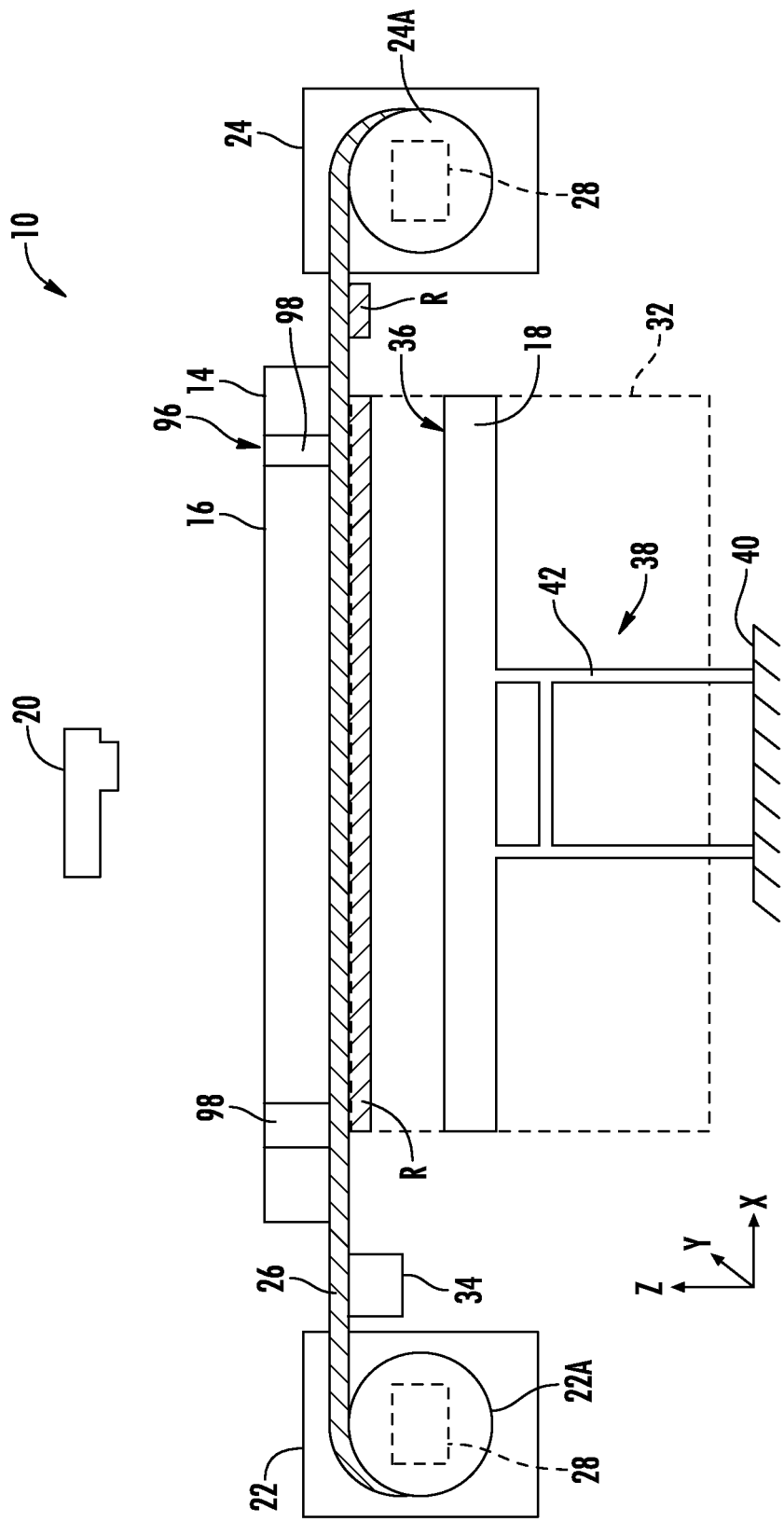
FIG. 8 is a front schematic view of the additive manufacturing apparatus with the stage separated from a resin in accordance with various aspects of the present disclosure.

Referring now to FIGS. 7 and 8, the method 200 can include, at step 202, depositing resin R onto the resin support 26 to define a resin surface 30. As provided herein, the material depositor 34 may be positioned upstream of the pivot device 70 and/or below the resin support 26 in the Z-axis direction without departing from the scope of the present disclosure. As such, while FIGS. 8-11 illustrate the material depositor 34 positioned below the resin support 26, the material depositor 34 may be in any other location without departing from the method provided herein.

With further reference to FIGS. 7 and 8, after the resin R is deposited, at step 204, the method 200 includes translating the resin support 26 to a position within the build zone 32. As provided herein, in some instances, the resin R is inverted such that the resin R is below the resin support 26 in a Z-axis direction during the translation. To further maintain the resin R on the resin support 26, the method 200, at step 206, can include precuring at least a portion of the resin R, which may occur prior to being inverted in some cases. In some embodiments, at step 208, the method 200 can further include applying a pressure from a resin support interaction device 96 onto the resin support 26. The pressure may be a negative pressure in which the resin support 26 is suctioned towards the support plate 14. Additionally, or alternatively, the pressure may be a positive pressure that may be used to detach the resin support 26 from the support plate 14 and/or reduce a frictional coefficient during movement of the resin support 26 along the support plate 14.

Figure 9:
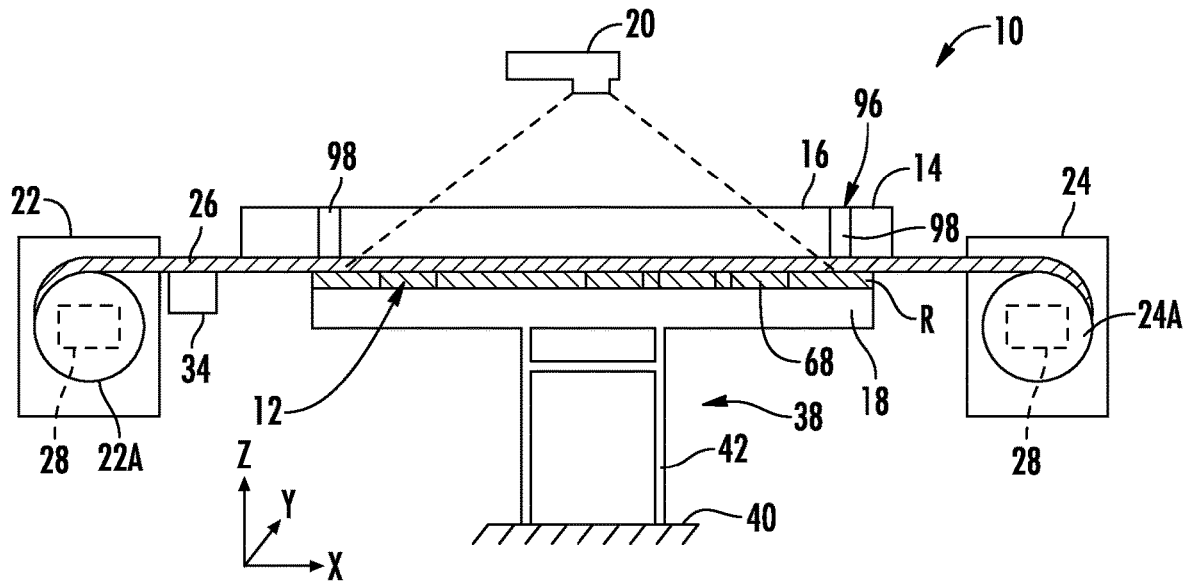
FIG. 9 is a front schematic view of the additive manufacturing apparatus with the stage in contact with the resin in accordance with various aspects of the present disclosure.

As illustrated in FIGS. 7 and 9, at step 210, the method 200 can include selectively curing the resin R using an application of radiant energy from a radiant energy device 20 to define a cross-sectional layer 68 of a component 12. Selectively curing the resin R can include, at step 212, emitting a first patterned image 78 from the radiant energy device 20 that is transmitted through the window 16.

Figure 10:
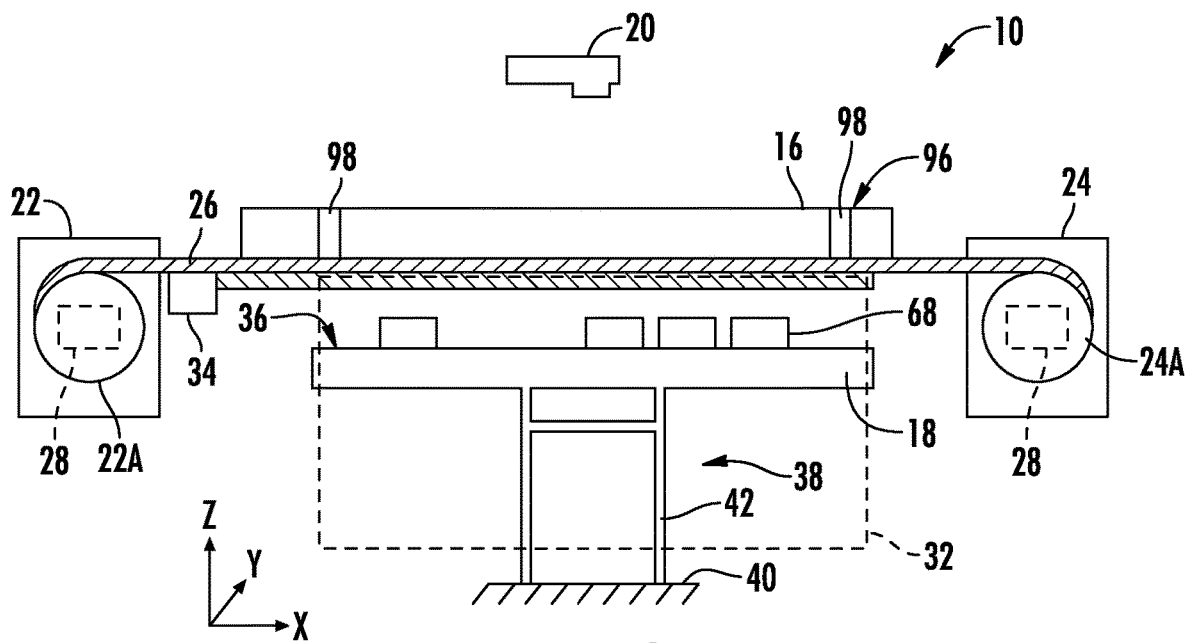
FIG. 10 is a front schematic view of the additive manufacturing apparatus with the stage supporting a first layer of a component that is separated from the resin in accordance with various aspects of the present disclosure.

As illustrated in FIGS. 7 and 10, once the first patterned image 78 is emitted, at step 214, the method 200 can include separating the stage 18 and the component 12 from the remaining resin R provided on the resin support 26 and the support plate 14. It will be understood that the resin R and/or the layer 68 of a component 12 do not necessarily join, stick, or bond with the surface of the resin support 26. Accordingly, as used herein the term "separate" refers to the process of moving two elements apart from each other and does not necessarily imply the act of breaking a bond or detaching one element from another. For example, at step 216, the method 200 can include lowering the stage 18 supporting the component 12 in a Z-axis direction to increase a separation distance between the support plate 14 and the stage 18. Additionally or alternatively, the method 200, at step 218, can include raising the support plate 14 in a Z-axis direction to increase a separation distance between the support plate 14 and a stage 18 supporting the component 12.

Once the component 12 and the uncured resin R are separated, the method 200, at step 220, can include translating the resin support 26 to a take-up module 24 with a portion of the resin R remaining on the resin support 26. During translation of the resin support 26, resin R is deposited on the resin support 26 with the newly deposited resin R being translated into the build zone 32 and the stage 18 may be moved towards the resin R.

Figure 11:
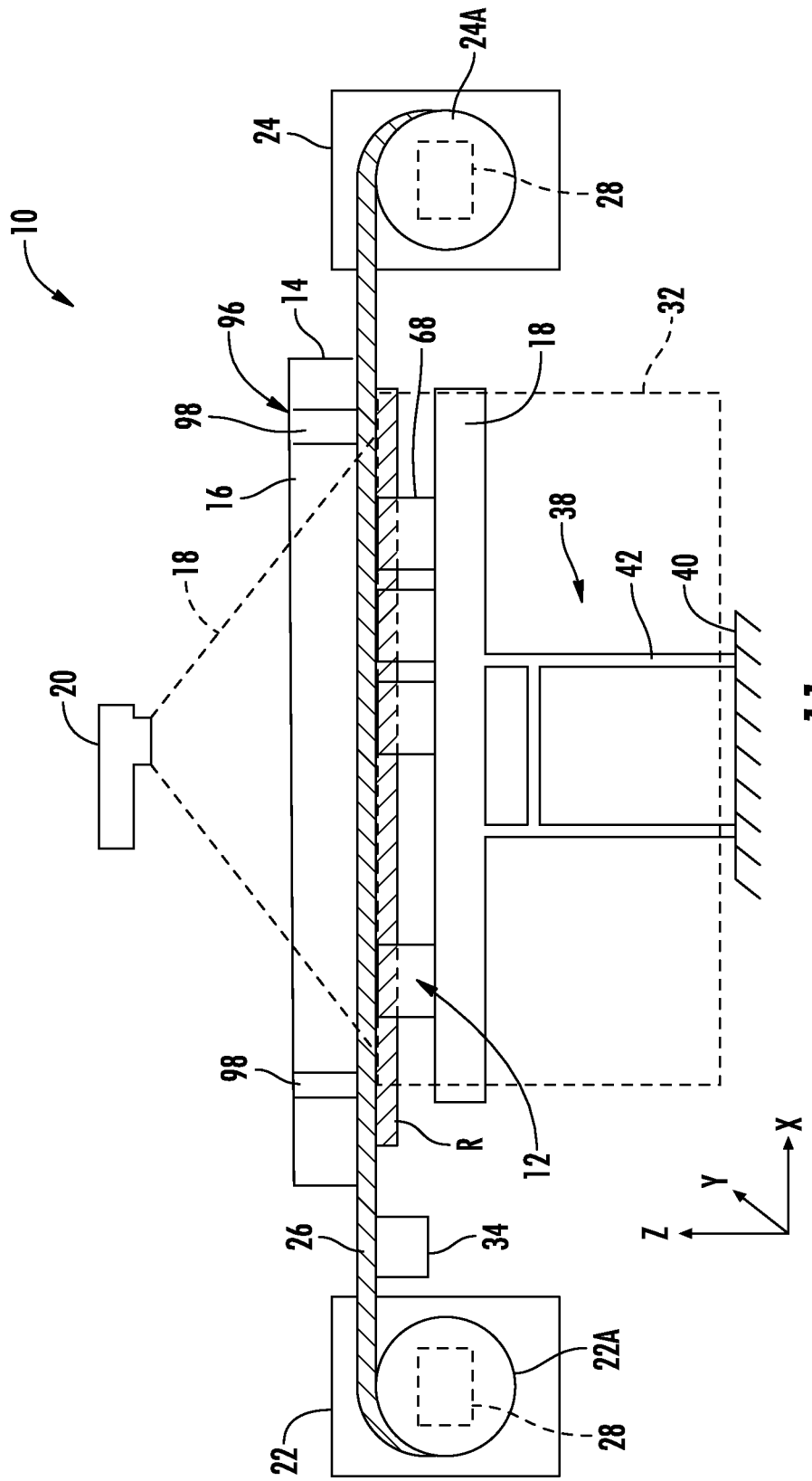
FIG. 11 is a front schematic view of the additive manufacturing apparatus with the stage maintaining a component proximate to the resin for curing of an additional layer of resin to the component in accordance with various aspects of the present disclosure.

As illustrated in FIGS. 7 and 11, at step 222, the method 200 can include curing a second layer 68 of the component 12. It will be appreciated that the stage 18 may move to any number (one or more) positions to form each layer 68 of the component 12 based on the component design. Likewise, the radiant energy device 20 may generate any number of patterned images 78.

Figure 12:
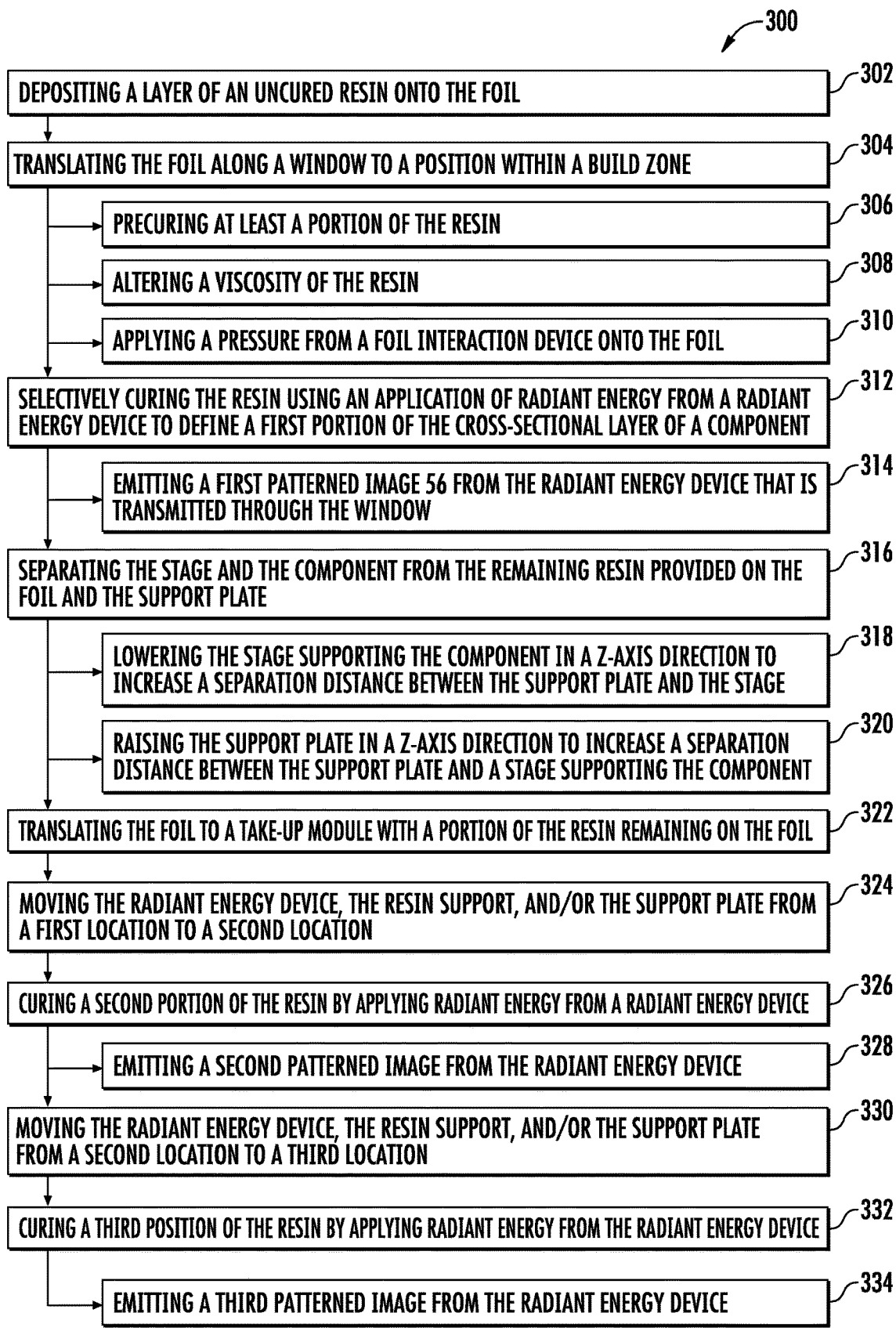
FIG. 12 is a method of operating the manufacturing apparatus in accordance with various aspects of the present disclosure.

Referring now to FIGS. 12-18, a method 300 for operating an additive manufacturing apparatus 10 is provided in conjunction with illustrations of the various steps in FIG. 12. The method 300 can be used to operate the additive manufacturing apparatus 10 or any other suitable additive manufacturing apparatus 10. As provided, the support plate 14, the window 16, and/or the resin support 26 may be operably coupled with the movement assembly 92 that allows for various portions of a single layer 68 of the component 12 to be formed through multiple patterned images 78. It will be appreciated, however, that the radiant energy device 20 and/or the stage 18 may additionally or alternatively be coupled with the movement assembly 92 thereby allowing for the single layer 68 of the component 12 to be formed through multiple patterned images 78 without departing from the scope of the present disclosure. It should be appreciated that the example method 300 is discussed herein only to describe example aspects of the present subject matter and is not intended to be limiting. Any of the steps within FIGS. 12-18 may be omitted or rearranged in any other order without departing from the scope of the present disclosure.

Figure 13:
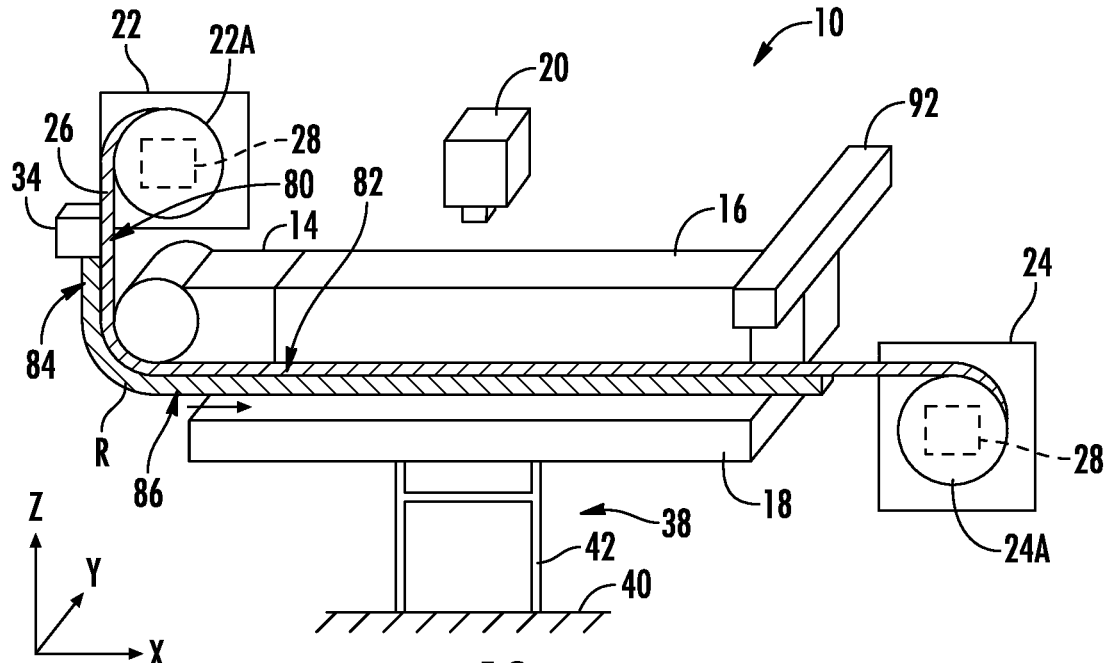
FIG. 13 is a front perspective view of the additive manufacturing apparatus with a radiant energy device in a first location in accordance with various aspects of the present disclosure.

Referring to FIGS. 12 and 13, the method 300 can include, at step 302, depositing resin R onto the resin support 26 to define a resin surface 30. As provided herein, the material depositor 34 may be positioned upstream of the pivot device 70 and/or below the resin support 26 in the Z-axis direction without departing from the scope of the present disclosure. As such, while FIGS. 13-18 illustrate the material depositor 34 positioned upstream of the pivot device 70, the material depositor 34 may be in any other location without departing from the method provided herein.

With further reference to FIGS. 12 and 13, at step 304, the method 300 includes translating the resin support 26 to a position within the build zone 32 with the resin R thereon. As provided herein, in some instances, the resin R is inverted such that the resin R is below the resin support 26 in a Z-axis direction during at least a portion of the translation between the feed module 22 and the take-up module 24. To further maintain the resin R on the resin support 26, the method 300, at step 306, can include precuring at least a portion of the resin R, which may occur prior to being inverted in some cases.

In several embodiments, at step 308, the method 300 may include altering a viscosity of the resin from a first viscosity to a second viscosity. The viscosity may be altered while the foil is being translated and/or after the foil has been translated and becomes stationary. As provided herein, the viscosity modification assembly 66 may be configured to apply a shearing stress to the resin R to alter the viscosity of the resin from the first viscosity to the second viscosity. In various instances, the second viscosity may be less than the first viscosity. Additionally or alternatively, the viscosity modification assembly 66 may be configured to heat (or cool) the resin to alter the viscosity of the resin from the first viscosity to the second viscosity.

In some embodiments, at step 310, the method 300 can further include applying a pressure from a resin support interaction device 96 onto the resin support 26. The pressure may be a negative pressure in which the resin support 26 is suctioned towards the support plate 14. Additionally, or alternatively, the pressure may be a positive pressure that may be used to detach the resin support 26 from the support plate 14 and/or reduce a frictional coefficient during movement of the resin support 26 along the support plate 14.

Figure 14:
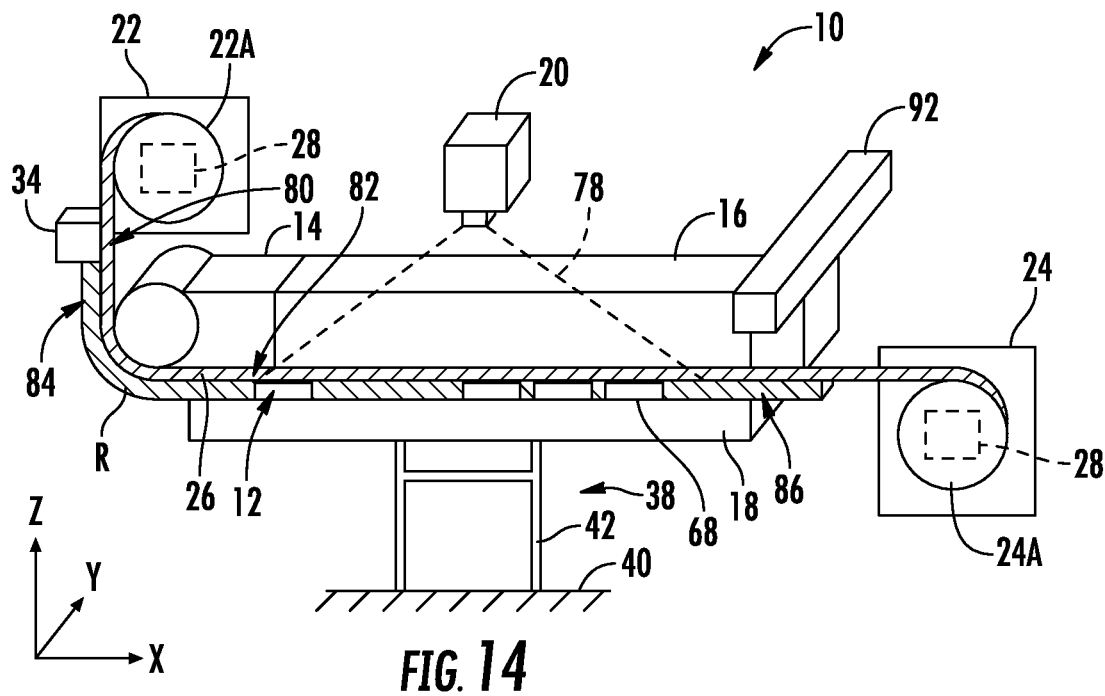
FIG. 14 is a front perspective view of the additive manufacturing apparatus with the radiant energy device in the first location curing a first portion of a layer of a component in accordance with various aspects of the present disclosure.

As illustrated in FIGS. 12 and 14, at step 312, the method 300 can include selectively curing the resin R using an application of radiant energy from a radiant energy device 20 to define a first portion of the cross-sectional layer 68 of a component 12. Selectively curing the resin R can include, at step 314, emitting a first patterned image 78 from the radiant energy device 20 that is transmitted through the window 16.

Figure 15:
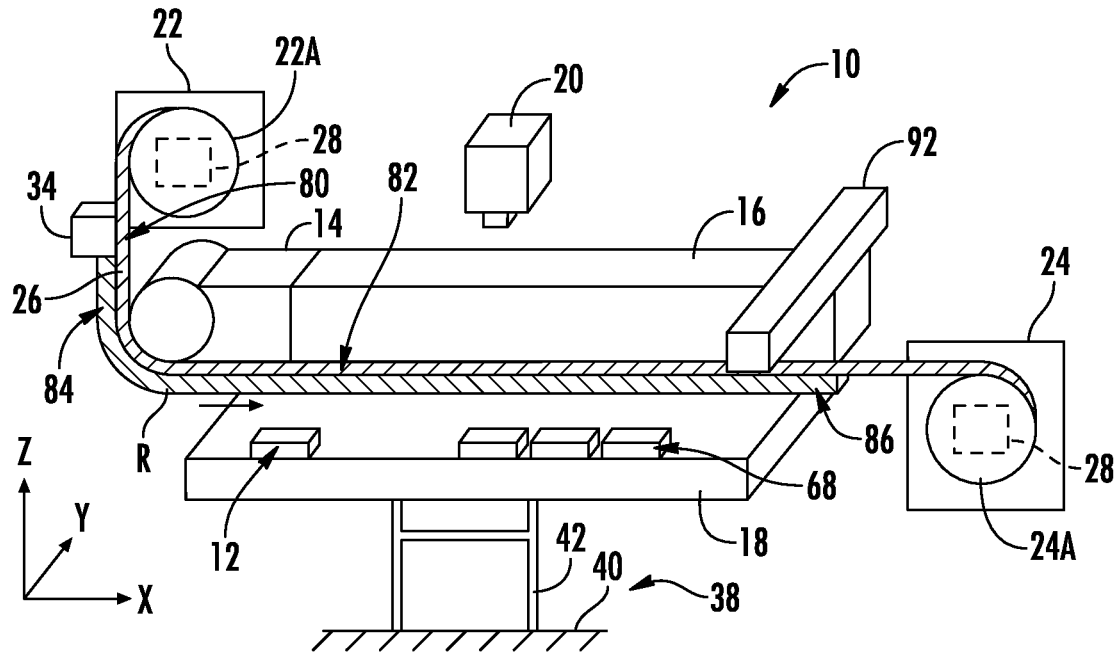
FIG. 15 is a front perspective view of the additive manufacturing apparatus with the radiant energy device in a second location in accordance with various aspects of the present disclosure.

As illustrated in FIGS. 12 and 15, once the first patterned image 78 is emitted, at step 316, the method 300 can include separating the stage 18 and the component 12 from the remaining resin R provided on the resin support 26. For example, at step 318, the method 300 can include lowering the stage 18 supporting the component 12 in a Z-axis direction to increase a separation distance between the resin support 26 and the stage 18. Additionally or alternatively, the method 300, at step 320, can include raising the support plate 14 in a Z-axis direction to increase a separation distance between the resin support 26 and a stage 18 supporting the component 12.

Once the component 12 and the uncured resin R are separated, the method 300, at step 322, can include translating the resin support 26 to a take-up module 24 with a portion of the resin R remaining on the resin support 26.

Figure 16:
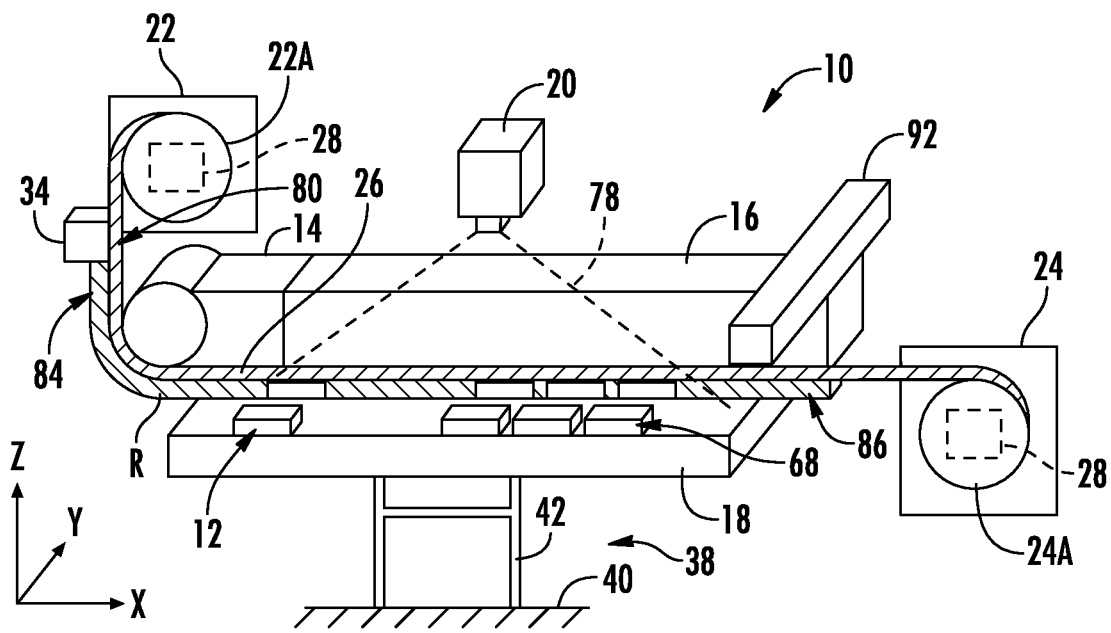
FIG. 16 is a front perspective view of the additive manufacturing apparatus with the radiant energy device in the second location curing a second portion of the layer of the component in accordance with various aspects of the present disclosure.

As generally illustrated in FIGS. 12 and 16, at step 324, the method 300 can include moving the radiant energy device 20, the resin support 26, and/or the support plate 14 from a first location to a second location. Moving at least one of the radiant energy device 20, the resin support 26, and/or the support plate 14 may be in an X-axis direction and/or a Y-axis.

At step 326, the method 300 can include curing a second portion of the resin R by applying radiant energy from a radiant energy device 20 through the window 16 and the resin support 26. Curing the second portion can further include, at step 328, emitting a second patterned image 78 from the radiant energy device 20 that is transmitted through the window 16. It will be appreciated that the second patterned image 78 may be different and/or generally similar to that of the first patterned image 78.

Figure 17:
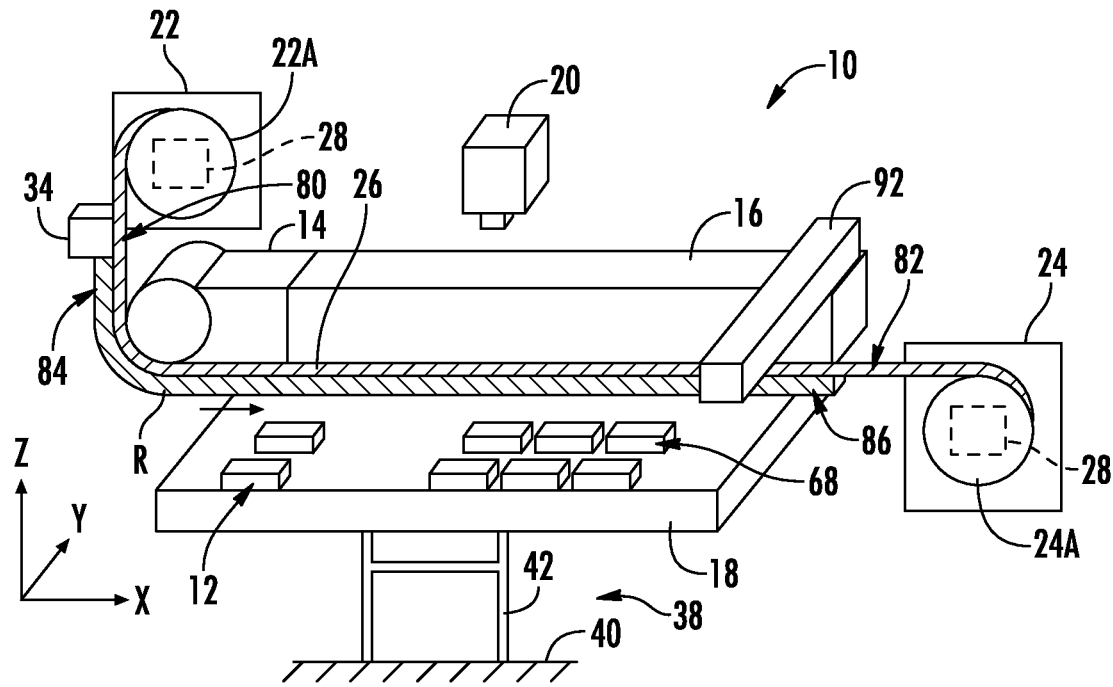
FIG. 17 is a front perspective view of the additive manufacturing apparatus with the radiant energy device in a third location in accordance with various aspects of the present disclosure.
Figure 18:
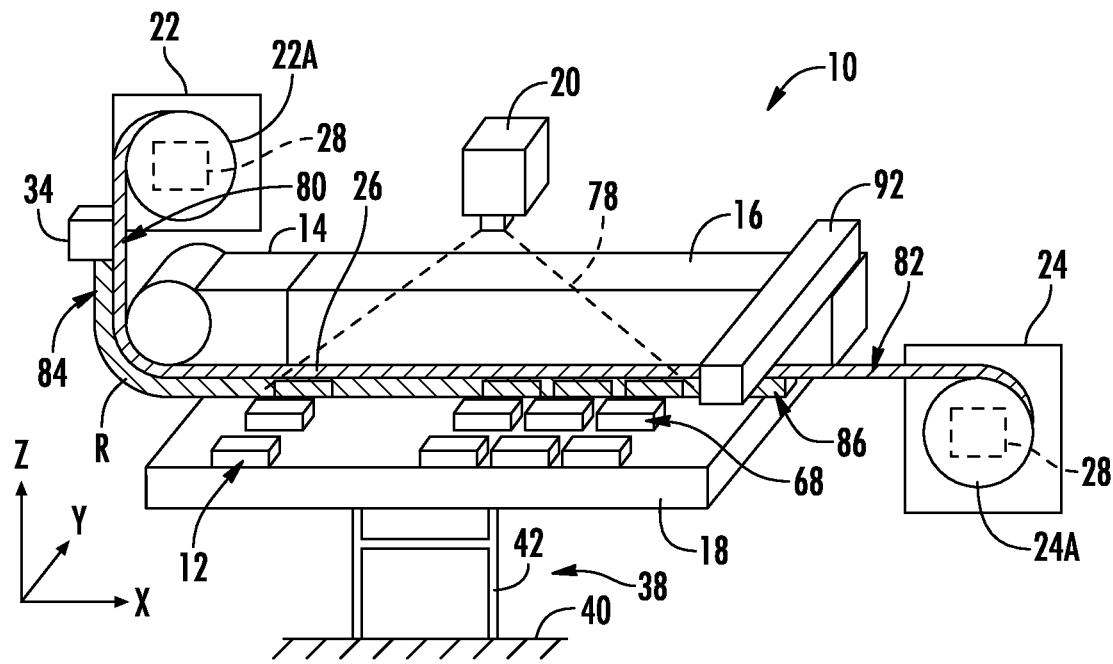
FIG. 18 is a front perspective view of the additive manufacturing apparatus with the radiant energy device in the third location curing a third portion of the layer of the component in accordance with various aspects of the present disclosure.

As illustrated in FIGS. 12 and 17, at step 330, the method 300 can include moving the radiant energy device 20, the resin support 26, and/or the support plate 14 from the second location to a third location along the Y-axis. At step 332, the method 300 can include curing a third portion of the resin R by applying radiant energy from the radiant energy device 20 through the window 16 and the resin support 26. Curing the third portion can further include, at step 334, emitting a third patterned image 78 from the radiant energy device 20 that is transmitted through the window 16. It will be appreciated that the third patterned image 78 may be different and/or generally similar to that of the first patterned image 78 and/or the second patterned image 78.

As provided herein, the radiant energy source may emit discrete patterned images 78 with movement of the radiant energy device 20, the resin support 26, and/or the stage 18 between each patterned image 78 that may be stitched to create the predefined geometry of the layer 68 of the component 12 by combining multiple radiant energy beams or patterns of suitable energy level with overlapping fields of view to produce a high-resolution image. Additionally or alternatively, the radiant energy device 20 may be capable of performing a scanning process in which the consecutive patterned images 78 are emitted from the radiant energy device 20 as the radiant energy device 20 is translated along the movement assembly 92.

After the third portion of the resin R is cured, the layer 68 of the component 12 may be completed. The method 300 provided herein may then repeated for each additional layer 68 until the component 12 is complete.

Figure 19:
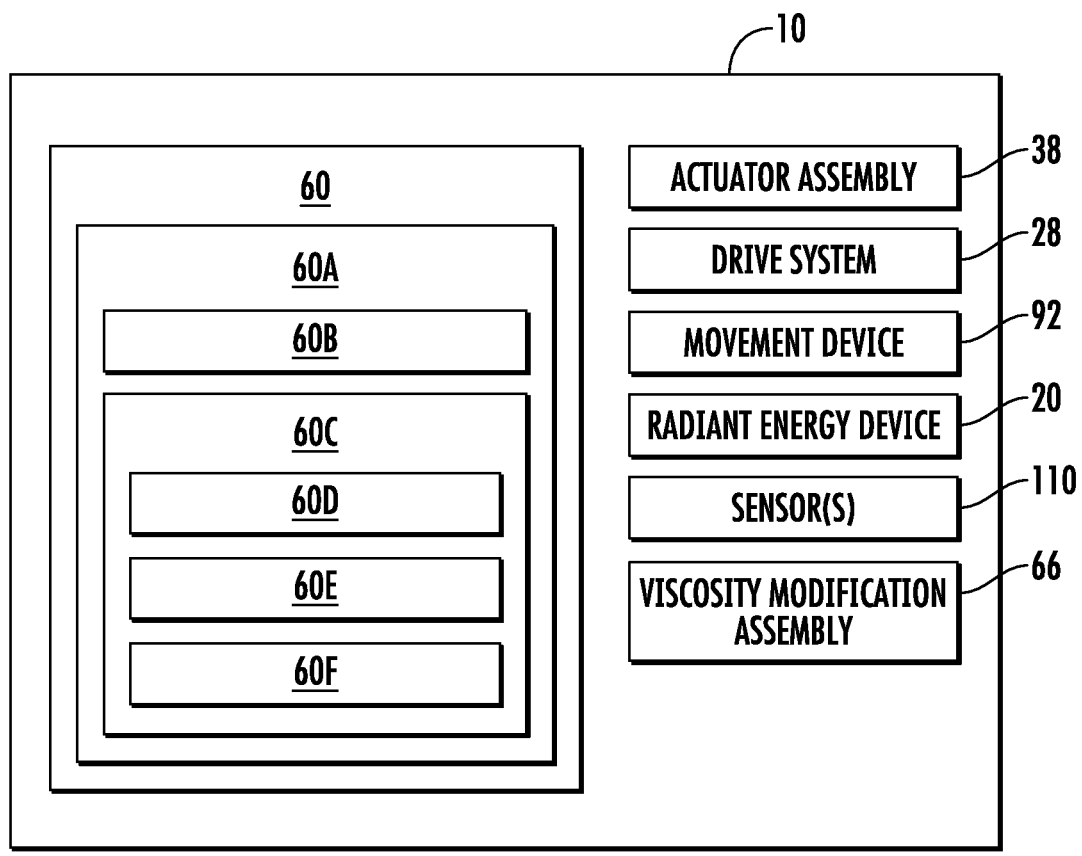
FIG. 19 depicts an exemplary computing system for an additive manufacturing apparatus in accordance with various aspects of the present disclosure.

FIG. 19 depicts certain components of computing system 60 according to example embodiments of the present disclosure. The computing system 60 can include one or more computing device(s) 60A which may be used to implement the methods 200, 300 such as described herein. The computing device(s) 60A can include one or more processor(s) 60B and one or more memory device(s) 60C. The one or more processor(s) 60B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 60C can include one or more non-transitory computer-readable storage medium(s), such as RAM, ROM, EEPROM, EPROM, flash memory devices, magnetic disks, etc., and/or combinations thereof.

The memory device(s) 60C can include one or more computer-readable media and can store information accessible by the one or more processor(s) 60B, including instructions 60D that can be executed by the one or more processor(s) 60B. The instructions 60D may include one or more steps of the methods 200, 300 described above, such as to execute operations of the actuator assembly 38, the drive system 28, the movement assembly 92, and/or the radiant energy device 20 of the additive manufacturing apparatus 10 described above. For instance, the memory device(s) 60C can store instructions 60D for running one or more software applications, displaying a user interface, receiving user input, processing user input, etc. In some implementations, the instructions 60D can be executed by the one or more processor(s) 60B to cause the one or more processor(s) 60B to perform operations, e.g., such as one or more portions of methods described herein. The instructions 60D can be software written in any suitable programming language or can be implemented in hardware. Additionally, and/or alternatively, the instructions 60D can be executed in logically and/or virtually separate threads on processor(s) 60B.

The one or more memory device(s) 60C can also store data 60E that can be retrieved, manipulated, created, or stored by the one or more processor(s) 60B. The data 60E can include, for instance, data to facilitate performance of the methods 200, 300 described herein. The data 60E can be stored in one or more database(s). The one or more database(s) can be connected to computing system 60 by a high bandwidth LAN or WAN or can also be connected to the computing system 60 through network(s) (not shown). The one or more database(s) can be split up so that they are located in multiple locales. In some implementations, the data 60E can be received from another device.

The computing system(s) 60 can also include a communication module or interface 60F used to communicate with one or more other component(s) of computing system 60 or the additive manufacturing apparatus 10 over the network (s). The communication interface 60F can include any suitable components for interfacing with one or more network(s), including, for example, transmitters, receivers, ports, controllers, antennas, or other suitable components.

As provided herein, the computing system 60 may be operably coupled with one or more of the actuator assembly 38, the drive system 28, the movement assembly 92, and/or the radiant energy device 20. The computing system 60 may be operably coupled with the movement assembly 92 to place the radiant energy device 20 in one or more positions. Various sensors 110 may be provided for detecting information related to movement of the stage 18, the resin support 26 and/or the radiant energy device 20. The information may be provided to the computing system 60, which, in turn, can alter a movement characteristic of the stage 18, the resin support 26, and/or the radiant energy device 20 in order to maintain a locus of the components relative to one another.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials."

Aspects of the invention(s) are provided by the subject matter of the following clauses, which are intended to cover all suitable combinations unless dictated otherwise based on logic or the context of the clauses and/or associated figures and description:

An additive manufacturing apparatus comprising: a stage configured to hold a component formed by one or more layers of resin; a support plate positioned above the stage; a radiant energy device positioned above the stage, the radiant energy device operable to generate and project energy in a predetermined pattern; a feed module configured to operably couple with a first end portion of a resin support and positioned upstream of the stage; and a take-up module configured to operably couple with a second end portion of the resin support and positioned downstream of the stage.

The additive manufacturing apparatus of one or more of these clauses, further comprising: an actuator configured to change a relative position of the stage and the resin support.

The additive manufacturing apparatus of one or more of these clauses, wherein the actuator is operably coupled with the stage and configured to increase a distance between the resin support and the stage.

The additive manufacturing apparatus of one or more of these clauses, wherein the actuator is operably coupled with the support plate and configured to increase a distance between the support plate and the stage.

The additive manufacturing apparatus of one or more of these clauses, further comprising: a pivot device configured to alter an orientation of the resin support such that the resin is alternated from an upward orientation in which the resin is above the resin support in a Z-axis direction upstream of the pivot device to an inverted orientation in which the resin is below the resin support in the Z-axis direction downstream of the pivot device.

The additive manufacturing apparatus of one or more of these clauses, further comprising: a material depositor positioned downstream of the feed module and at least partially upstream of a pivot device configured to alter a relationship of the resin relative to the resin support in a Z-axis direction.

The additive manufacturing apparatus of one or more of these clauses, further comprising: a material depositor is positioned below the resin support in a Z-axis direction.

The additive manufacturing apparatus of one or more of these clauses, further comprising: a material depositor is upstream of a pivot device, the material depositor configured to deposit the resin on the resin support when the resin support is non-parallel to an X-axis direction.

The additive manufacturing apparatus of one or more of these clauses, wherein the material depositor is configured to apply a layer of the resin to a first portion of the resin support with the resin support in a generally perpendicular position relative to a second portion of the resin support positioned between the stage and the radiant energy device.

The additive manufacturing apparatus of one or more of these clauses, further comprising: a precuring device configured to project radiant energy at the resin on the resin support upstream of the stage.

The additive manufacturing apparatus of one or more of these clauses, wherein the resin is maintained in an inverted position in which the resin support is positioned above the resin while the stage is below the resin, and wherein a portion of the resin maintains the inverted position as the resin support is translated to the take-up module.

A method of operating an additive manufacturing apparatus, the method comprising: depositing a layer of a resin onto a resin support; translating the resin support to a position within a build zone, wherein the resin is positioned below the resin support in a Z-axis direction while positioned within the build zone; selectively curing the resin using an application of radiant energy from a radiant energy device to define a first cross-sectional layer of a component; and translating the resin support to a take-up module with a portion of the resin remaining on the resin support.

The method of one or more of these clauses, further comprising: lowering a stage supporting the component in the Z-axis direction to increase a separation distance between a support plate and the stage.

The method of one or more of these clauses, further comprising: raising a support plate in the Z-axis direction to increase a separation distance between a support plate and a stage supporting the component.

The method of one or more of these clauses, further comprising: precuring at least a portion of the resin prior to being inverted.

The method of one or more of these clauses, further comprising: moving at least one of the radiant energy device or a support plate in an X-axis direction or a Y-axis direction prior to an additional step of selectively curing the resin using the application of radiant energy from the radiant energy device to define a second cross-sectional layer of the component.

An additive manufacturing apparatus comprising: a stage configured to hold a component formed from one or more layers of a resin; a radiant energy device operable to generate and project energy in a predetermined pattern; a support plate at least partially positioned between the radiant energy device and the stage; a material depositor configured to apply the resin on a resin support, the resin having a first viscosity; and a viscosity modification assembly configured to alter the first viscosity of the resin to a second viscosity.

The additive manufacturing apparatus of one or more of these clauses, wherein the material depositor is configured as a transfer roller positioned below the resin support and configured to apply the resin to the resin support upstream of the stage.

The additive manufacturing apparatus of one or more of these clauses, wherein the viscosity modification assembly is configured to alter the first viscosity of the resin to the second viscosity by applying a shear stress to the resin.

The additive manufacturing apparatus of one or more of these clauses, wherein the shear stress is applied to the resin prior to the radiant energy device projecting energy in a predetermined pattern onto the resin.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. Moreover, it will be appreciated that the phrase "configured to" or "adapted to" denotes an actual state of configuration that fundamentally ties at least one component described herein to the physical characteristics of the component preceding the phrase "configured to" or "adapted to".

What is claimed is:

1. An additive manufacturing apparatus comprising:
    a stage configured to hold a component formed by one or more layers of resin;
    a support plate positioned above the stage;
    a radiant energy device positioned above the stage, the radiant energy device operable to generate and project energy in a predetermined pattern;
    a feed module configured to operably couple with a first end portion of a resin support and positioned upstream of the stage;
    a take-up module configured to operably couple with a second end portion of the resin support and positioned downstream of the stage; and
    a material depositor positioned below the resin support and above the stage in a Z-axis direction.

2. The additive manufacturing apparatus of claim 1, further comprising:
    an actuator configured to change a relative position of the stage and the resin support.

3. The additive manufacturing apparatus of claim 2, wherein the actuator is operably coupled with the stage and configured to increase a distance between the resin support and the stage.

4. The additive manufacturing apparatus of claim 2, wherein the actuator is operably coupled with the support plate and configured to increase a distance between the support plate and the stage.

5. The additive manufacturing apparatus of claim 1, further comprising:

a pivot device configured to alter an orientation of the resin support such that the resin is alternated from an upward orientation in which the resin is above the resin support in a Z-axis direction upstream of the pivot device to an inverted orientation in which the resin is below the resin support in the Z-axis direction downstream of the pivot device.

6. The additive manufacturing apparatus of claim 1, further comprising:
a material depositor positioned downstream of the feed module and at least partially upstream of a pivot device configured to alter a relationship of the resin relative to the resin support in a Z-axis direction.

7. The additive manufacturing apparatus of claim 1, further comprising:
a material depositor is upstream of a pivot device, the material depositor configured to deposit the resin on the resin support when the resin support is non-parallel to an X-axis direction.

8. The additive manufacturing apparatus of claim 7, wherein the material depositor is configured to apply a layer of the resin to a first portion of the resin support with the resin support in a generally perpendicular position relative to a second portion of the resin support positioned between the stage and the radiant energy device.

9. The additive manufacturing apparatus of claim 1, further comprising:
a precuring device configured to project radiant energy at the resin on the resin support upstream of the stage.

10. The additive manufacturing apparatus of claim 1, wherein the resin is maintained in an inverted position in which the resin support is positioned above the resin while the stage is below the resin, and wherein a portion of the resin maintains the inverted position as the resin support is translated to the take-up module.

11. An additive manufacturing apparatus comprising:
a stage configured to hold a component formed from one or more layers of a resin;
a radiant energy device operable to generate and project energy in a predetermined pattern;
a support plate at least partially positioned between the radiant energy device and the stage;
a material depositor configured to apply the resin on a resin support, the resin having a first viscosity, wherein the material depositor is configured as a transfer roller positioned below the resin support and configured to apply the resin to the resin support upstream of the stage; and
a viscosity modification assembly configured to alter the first viscosity of the resin to a second viscosity.

12. The additive manufacturing apparatus of claim 11, wherein the viscosity modification assembly is configured to alter the first viscosity of the resin to the second viscosity by applying a shear stress to the resin.

13. The additive manufacturing apparatus of claim 12, wherein the shear stress is applied to the resin prior to the radiant energy device projecting energy in a predetermined pattern onto the resin.

* * * * *